(12) United States Patent
Vangell et al.

(10) Patent No.: US 11,030,549 B1
(45) Date of Patent: Jun. 8, 2021

(54) LEAD CAPTURE, MANAGEMENT, AND DEMONSTRATION SCHEDULING SYSTEM AND PROCESS

(71) Applicants: Ronald M Vangell, San Clemente, CA (US); Kevin G Cooper, Laguna Hills, CA (US)

(72) Inventors: Ronald M Vangell, San Clemente, CA (US); Kevin G Cooper, Laguna Hills, CA (US)

(73) Assignee: NcompassTrac, LLC., Laguna Hills, CA (US)

( * ) Notice: Subject to any disclaimer, the term of this patent is extended or adjusted under 35 U.S.C. 154(b) by 79 days.

(21) Appl. No.: 16/188,603

(22) Filed: Nov. 13, 2018

Related U.S. Application Data

(63) Continuation-in-part of application No. 14/730,085, filed on Jun. 3, 2015, now abandoned.

(60) Provisional application No. 62/007,215, filed on Jun. 3, 2014.

(51) Int. Cl.
  *G06Q 10/02* (2012.01)
  *G06Q 30/06* (2012.01)
  *G06Q 50/30* (2012.01)
  *G06Q 10/00* (2012.01)

(52) U.S. Cl.
  CPC ......... *G06Q 10/02* (2013.01); *G06Q 30/0637* (2013.01); *G06Q 30/0645* (2013.01); *G06Q 50/30* (2013.01); *G06Q 10/00* (2013.01); *G06Q 2240/00* (2013.01)

(58) Field of Classification Search
  CPC .. G06Q 10/02; G06Q 30/063; G06Q 30/0645; G06Q 50/30; G06Q 2240/00; G06Q 10/00

USPC ........................................................ 703/7.24
See application file for complete search history.

(56) References Cited

U.S. PATENT DOCUMENTS

| | | | | |
|---|---|---|---|---|
| 7,802,721 | B2 * | 9/2010 | Wilson, Jr. ........... | G06Q 30/018 235/380 |
| 8,500,009 | B2 * | 8/2013 | Clapsaddle ........ | G06Q 30/0201 235/380 |
| 2006/0131395 | A1 * | 6/2006 | Potts ................... | G07F 17/3237 235/380 |
| 2008/0231446 | A1 * | 9/2008 | Cresto ................. | G06Q 10/087 340/572.1 |
| 2009/0114720 | A1 * | 5/2009 | Wilson, Jr. ............ | G06Q 30/02 235/380 |
| 2011/0015953 | A1 * | 1/2011 | Maunus ................ | G06Q 10/06 705/5 |
| 2011/0099036 | A1 * | 4/2011 | Sarkissian ............. | G06Q 10/02 705/5 |
| 2013/0090968 | A1 * | 4/2013 | Borza ................... | G06Q 10/06 705/7.16 |
| 2013/0332207 | A1 * | 12/2013 | Brunel ................ | G06Q 10/109 705/5 |
| 2015/0039365 | A1 * | 2/2015 | Haque .............. | G06Q 10/06311 705/7.13 |

(Continued)

*Primary Examiner* — Rutao Wu
*Assistant Examiner* — Abdallah A El-Hage Hassan
(74) *Attorney, Agent, or Firm* — Plager Schack LLP; Mark H. Plager; Stephen Hallberg

(57) ABSTRACT

A lead capture, management, and demonstration scheduling system and process is disclosed. All information is captured electronically and presented in real time. Equipment check in/out is monitored electronically and displayed for all to see. Digital communication to and from OEM to rider-driver keeps everyone informed of status.

10 Claims, 8 Drawing Sheets

(56) References Cited

U.S. PATENT DOCUMENTS

2015/0358400 A1* 12/2015 Bartlett, II .............. H04W 4/80
                                                                 709/201

* cited by examiner

LEAD CAPTURE, MANAGEMENT, AND DEMONSTRATION SCHEDULING SYSTEM AND PROCESS

CLAIM OF BENEFIT TO PRIOR APPLICATION

This application is a continuation-in-part (CIP) application of and claims benefit to U.S. Non-Provisional patent application Ser. No. 14/730,085, entitled "LEAD CAPTURE, MANAGEMENT, AND DEMONSTRATION SCHEDULING SYSTEM AND PROCESS," filed Jun. 3, 2015. The U.S. Non-Provisional patent application Ser. No. 14/730,085 is incorporated herein by reference.

BACKGROUND

Embodiments of the invention described in this specification relate generally to consumer tracking and communication systems, and more particularly, to lead capture, management, and demonstration scheduling systems used in consumer tracking and communication systems.

For events such as motorcycle shows, automotive shows, etc., many people wish to evaluate equipment by trying it out. For instance, a person may go to a car show to test drive several different cars. For original equipment manufacturers (OEMs) and resellers of equipment, scheduling riders and drivers at such events is typically a manual, cumbersome process. For instance, to test out certain equipment, such as motorcycles and automobiles, a person generally needs to satisfy certain criteria, such as age. Authenticating such criteria is often slow when it is done manually and communicating with interested consumers is slow due to the paper-based manual work required to get the interested consumers working with actual equipment.

In addition to manually preparing the paperwork for test drivers and riders, many OEMs and/or resellers wish to capture certain consumer data in relation to the interested riders and drivers. However, like the manual paperwork process required to get an interested consumer working with a piece of equipment, the process for capturing relevant consumer data is also manual, slow, and cumbersome.

Adding to the time and hassle-based pressures, OEMs and resellers are always concerned about paper forms, documents, and other information getting lost or destroyed as it is transported back to a facility in which it would be digitally entered into a persistent storage of a computer system, but as a result of destruction or being lost, the consumer data and information never gets entered or saved in the system.

Therefore, what is needed is a way to capture all relevant consumer information electronically at a live event or equipment showcase, and present the captured consumer data in near real-time to other interested parties, including the ability to have equipment check in/out that is monitored electronically and displayed for all to see, such that digital communication to and from OEM to rider-driver keeps everyone informed of status.

BRIEF DESCRIPTION

Some embodiments of the invention include a novel lead capture, management, and demonstration scheduling system that captures information of a consumer interested in trying a particular equipment item at a live event and schedules a time for the consumer to try the particular equipment item. The system of some embodiments transmits the captured consumer information and the equipment usage schedule to a cloud database for live reporting of consumer activity in relation to the equipment at the live event.

Some embodiments include a lead capture, management, and demonstration scheduling process for capturing information of a consumer interested in trying a particular equipment item at a live event and scheduling a time for the consumer to try the particular equipment item.

Some embodiments include a real-time schedule change process for capturing equipment demonstration booking updates and changing a daily schedule in real-time during a live event.

In some embodiments, the lead capture, management, and demonstration scheduling system includes an event-driven real-time schedule change capturing and updating sub-system. In some embodiments, the lead capture, management, and demonstration scheduling system is deployed at a live event venue which includes a live event local network and geofenced or non-geofenced equipment demo areas.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
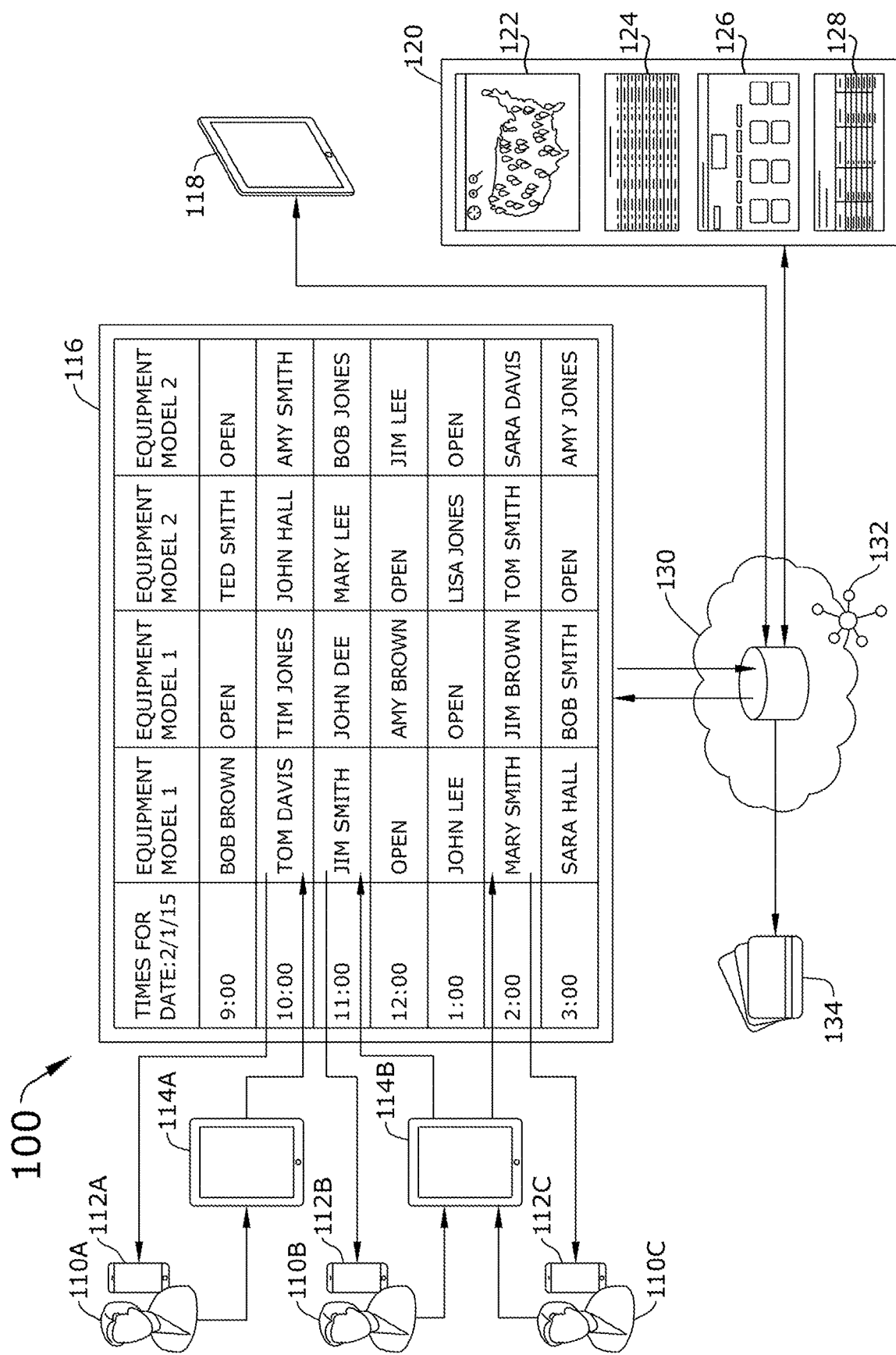
FIG. 1 conceptually illustrates a lead capture, management, and demonstration scheduling system in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

For purposes of the inventive embodiments described in this specification, a lexicography is included here to define some terms and terminology used throughout the description. Specifically, the term "geofence" refers to virtual perimeter, which includes a known area defined by the perimeter. The perimeter can be configured in any shape, such as a circular, triangular, rectangular, or any other enclosed shape perimeter around an area. The perimeter may be defined by location coordinates, such as those used in global positioning systems (GPS), or by surface-level devices, such as Bluetooth beacons and RFID tags/emitters. When a mobile device of a person includes GPS (or Bluetooth or RFID), it is possible to determine whether the person is within the bounded area of the geofence perimeter. For instance, an application that runs on a mobile device may continuously retrieve location information from the mobile device GPS device (or Bluetooth, etc.), which itself is continuously computing its physical location based on satellite location information received from multiple GPS satellites, and the application running on the mobile device may, in turn, transmit the computed physical location of the mobile device to a nearby server that checks whether the mobile device physical location is within a known geofence area. While this example provides one manner of determining whether a person is within a geofence area, a person skilled in the relevant art would appreciate the many different and other ways of doing so.

Some embodiments of the invention include a lead capture, management, and demonstration scheduling system that captures information of a consumer interested in trying a particular equipment item at a live event and schedules a time for the consumer to try the particular equipment item, a lead capture, management, and demonstration scheduling process for capturing information of a consumer interested in trying a particular equipment item at a live event and scheduling a time for the consumer to try the particular equipment item, and a real-time schedule change process for capturing equipment demonstration booking updates and changing a daily schedule in real-time during a live event.

In some embodiments, the lead capture, management, and demonstration scheduling system transmits the captured consumer information and the equipment usage schedule to a cloud database for live reporting of consumer activity in relation to the equipment at the live event. In some embodiments, the lead capture, management, and demonstration scheduling system includes an event-driven real-time schedule change capturing and updating sub-system. In some embodiments, the lead capture, management, and demonstration scheduling system is deployed at a live event venue which includes a live event local network and geofenced or non-geofenced equipment demo areas.

As stated above, for events such as motorcycle, automotive or other, the process of scheduling riders and drivers, authenticating and communicating with them is manual and paper based. Capture of rider-driver information is manual. This is a problem since consumer data and other documents needed for legal purposes can get lost or destroyed, and OEMs, distributors, resellers, and other interested parties may not be able to know what is happening with certain kinds and/or brands of equipment during a live event.

Embodiments of the lead capture, management, and demonstration scheduling system and process described in this specification solve such problems by capturing information of a consumer interested in trying a particular equipment item at a live event and scheduling a time for the consumer to try the particular equipment item. In some embodiments, the lead capture, management, and demonstration scheduling system and process captures such consumer information by scanning the consumer's driver's license and validating whether it is current, and that the consumer is a driver is of correct age. All data is electronically captured and saved by the lead capture, management, and demonstration scheduling system. All paper waiver forms and collateral are electronically signed and saved in the lead capture, management, and demonstration scheduling system. Demonstration times are shown electronically and selected by the consumer (or "rider") or the OEM on behalf of the rider. An electronic schedule board displays each validated and scheduled rider with a date and a time. In some embodiments, the lead capture, management, and demonstration scheduling system and process sends an email or text to the rider to communicate to him/her the ride times, any specials to be promoted and reminders. All data is stored to a server of the lead capture, management, and demonstration scheduling system for legal and marketing purposes.

Embodiments of the lead capture, management, and demonstration scheduling system described in this specification differ from and improve upon currently existing event demonstration scheduling mechanisms. In particular, some embodiments of the lead capture, management, and demonstration scheduling system differ because to date, only paper manual processes are used. In addition, the lead capture, management, and demonstration scheduling system improves upon the currently existing event demonstration scheduling mechanisms because even when manual paper scheduling is performed accurately by an OEM or distributor at an event, the fact is that there are many other involved people who may not be so accurate. For instance, when only manual paper processes are used, interested riders and drivers may get confused and/or forget ride times that have been manually scheduled. Adding to these difficulties is the fact that legal waiver forms and other documents are often lost or not stored correctly, thereby exposing OEMs and/or distributors in the event of accidents or other incidents. Furthermore, OEMs cannot track riders or equipment.

In contrast, the lead capture, management, and demonstration scheduling system performs methods or processes whereby relevant information is captured electronically and presented in real time. In this way, equipment check in/out is monitored by the scheduling system electronically and displayed for all to see. Moreover, digital communication to and from an OEM to a rider and/or driver keeps everyone informed of the status of the equipment, the rider, and/or the driver. In some embodiments, the processes or methods performed by the lead capture, management, and demonstration scheduling system are embedded into electronic systems (i.e., computing devices, servers, processors, etc.) that capture, mange, or track personnel data and forms, and which schedule any type of equipment or other resource for use.

In this specification, there are several descriptions of methods and processes that are performed by the lead capture, management, and demonstration scheduling system and/or software running on a computing device (e.g., a smartphone, a tablet computing device, a custom demonstration scheduling computing device, etc.) while accessing and interacting with the lead capture, management, and demonstration scheduling system. However, it should be noted that for the purposes of the embodiments described in this specification, the word "method" is used interchangeably with the word "process". Methods performed by the lead capture, management, and demonstration scheduling system and/or software running on a computing device while accessing and interacting with the lead capture, management, and demonstration scheduling system are described, therefore, by reference to several example processes that conceptually illustrate process steps for capturing information of a consumer interested in trying a particular equipment item at a live event and scheduling a time for the consumer to try the particular equipment item.

Several more detailed embodiments of the lead capture, management, and demonstration ("demo") scheduling system and processes are described in the sections below. Section I describes an exemplary lead capture, management, and demo scheduling system. Section II describes exemplary lead capture, management, and demo scheduling processes. Section III describes examples of capturing relevant consumer information and scheduling of equipment at a live event. Section IV describes an electronic system that implements one or more of the lead capture, management, and demo scheduling processes.

I. Lead Capture, Management, and Demo Scheduling System

In some embodiments, the lead capture, management, and demonstration scheduling system captures information of a consumer interested in trying a particular equipment item at a live event and schedules a time for the consumer to try the particular equipment item. The lead capture, management, and demonstration scheduling system of some embodiments transmits the captured consumer information and the equipment usage schedule to a database that is accessible to computing devices from a network, such as the Internet (hereinafter referred to as the "cloud"). The transmitted consumer information and equipment usage schedule is stored in the database and retrieved periodically by one or more computing devices at the live event accessing the lead capture, management, and demonstration scheduling system for live reporting of consumer activity in relation to the equipment.

By way of example, FIG. 1 conceptually illustrates a lead capture, management, and demonstration scheduling system 100. As shown in this figure, the lead capture, management, and demonstration scheduling system 100 includes a plurality of consumers 110A, 110B, and 110C, each consumer with a mobile computing device, 112A, 112B, and 112C, respectively. The lead capture, management, and demonstration scheduling system 100 also includes a set of tablet computing devices 114A and 114B, which are used to capture information about the consumers 110A, 110B, and 110C and identify scheduling options for the consumers to try the particular equipment items in which they are interested in trying. A master schedule 116 is stored in a cloud database 130 that is accessible to the tablet computing devices 114A and 114B, as well as computing devices associated with equipment dealers, OEMs, and other such entities showing equipment at the live event or otherwise having an interest in the demonstration scheduling. In this figure, a single dealer computing device 118 is shown as representative of any dealer computing device accessing the lead capture, management, and demonstration scheduling system 100 in relation to one or more items of equipment. The cloud database 130 stores other data sets derived from the consumer information captured at the live event, including demographics, metrics, and reports 120. Examples of such demographics, metrics, and reports 120 include, without limitation, demographics maps 122, consumer transaction reports 124, report overviews 126, and summarized revenue reports 128 for emailing and reporting to interested entities. Social links into the cloud database 130 and optional reward cards/benefits 134 are also possible in some embodiments of the lead capture, management, and demonstration scheduling system 100, as shown in this figure.

The lead capture, management, and demonstration scheduling system 100 is used in general to management the scheduling of riders (consumers) in relation to a variety of equipment being shown at an event, and to communicate relevant scheduling information to interested and necessary entities. As this figure demonstrates, then, each consumer is interested in trying a particular equipment item that is being shown at a live event. Specifically, consumer 110A provides required consumer information by way of tablet computing device 114A and gets scheduled as "TOM DAVIS" for a demonstration of "EQUIPMENT MODEL 1" at 10:00 on 2/1/15. Once scheduled, the lead capture, management, and demonstration scheduling system 100 transmits a notification to the mobile computing device 112A of consumer 110A.

Similarly, consumer 110B provides required consumer information by way of tablet computing device 114B and gets scheduled as "JIM SMITH" for a demonstration of "EQUIPMENT MODEL 1" at 11:00 on 2/1/15. Once scheduled, the lead capture, management, and demonstration scheduling system 100 transmits a notification to the mobile computing device 112B of consumer 110B. Rounding out the consumers in this example is consumer 110C, who provides required consumer information by way of tablet computing device 114B (same as consumer 110B) and gets scheduled as "MARY SMITH" for a demonstration of "EQUIPMENT MODEL 1" at 2:00 on 2/1/15. Once scheduled, the system transmits a notification to the mobile computing device 112C of consumer 110C.

Meanwhile, all the required consumer information is transmitted by the lead capture, management, and demonstration scheduling system 100 to the cloud database, where it is retrieved by dealer computing device 118 and incorporated in one or more of the demographics, metrics, and reports 120.

To make the lead capture, management, and demonstration scheduling system of the present disclosure, a person may develop software to read many driver permit formats (PDF 417, barcode, mag stripe, etc.). The software may have the ability to parse the information correctly and process logic against data such as valid age, valid driver's class, date of expiration, etc. The software may also be able to present legal forms digitally and capture signatures in relation to acceptance or acknowledgment. A server component may be included to record and speak to each capturing device using industry protocols over a secure network and update schedule and inform client capture device of times and schedule information. An Internet link insures the transmission of the data to the cloud or host on premise server but can be intermittent. The software must detect when the connection to the Internet is down and queue the transactions locally until a valid link to the Internet is up and working. All data is preserved across devices and shared with OEM personnel and consumers based on roles and rights.

In some embodiments, each lead capture computing device is present as standalone for lead data capture or joined with the lead capture, management, and demonstration scheduling system. In some embodiments, a proxy server is included to handle local event requests for local schedule display, including times, equipment items, OEM information, and dates. In some embodiments, a lead capture computing device includes a driver's permit capture component that can operate independently with or without an Internet connection and with or without the proxy scheduler display.

To use the lead capture, management, and demonstration scheduling system of the present disclosure, software is installed via the server (e.g., a server in the cloud that provides a service, or a server that is on a computing device on the event premises) for the driver's permit capture system. In some embodiments, the lead capture computing devices are connected to the SSID of the network to communicate with the server-capture software. A display is plugged in to the server to view the schedule times and equipment types. An optional internet connection is connected used to send data to central host real time. If not connected, then data will be stored and forwarded once a connected to the internet is found. Once all connected, the system is ready for use. A user (e.g., an OEM agent or rider-driver) scans a driver's license of the driver to begin process. Waiver forms are presented and signed by riders and drivers then equipment available times are presented for test drive or riding.

In some embodiments, one or more computing devices accessing the lead capture, management, and demonstration scheduling system at the live event perform the lead capture, management, and demonstration scheduling process for capturing information of a consumer interested in trying a particular equipment item at a live event and scheduling a time for the consumer to try the particular equipment item. The next section describes details of such a lead capture, management, and demonstration scheduling process.

II. Lead Capture, Management, and Demo Scheduling Process

The lead capture, management, and demonstration scheduling system of the present disclosure may be comprised of the following elements which may allow the lead capture, management, and demonstration scheduling system to perform one or more methods or processes that may include the following steps. This list of possible constituent elements/steps is intended to be exemplary only and it is not intended that this list be used to limit the lead capture, management, and demonstration scheduling system, methods or processes of the present application to just these elements or steps. Persons having ordinary skill in the art relevant to the present disclosure may understand there to be equivalent elements and steps that may be substituted within the present disclosure without changing the essential function or operation of the lead capture, management, and demonstration scheduling system.

1. Capture driver's license information (e.g., scanner device, camera/image capture device, manual input, etc.)
2. Check for valid drivers or motorcycle operator's license (e.g., software automatically checks)
3. Displays equipment available (e.g., display screen, tablet computing device, etc.)
4. Receive a selection of equipment for rider/driver to test ride
5. Publish updated schedule based on the received equipment selection
6. Transmit data to server for retention (e.g., persistence in database) and real time communication
7. Generate reports for rider demographics, equipment types, and event The various elements/steps of the lead capture, management, and demonstration scheduling system of the present disclosure may be related in the following exemplary fashion. It is not intended to limit the scope or nature of the relationships between the various elements/steps and the following examples are presented as illustrative examples only. For all steps, constant communication between riders/drivers and scheduled times may be linked. Equipment may be matched to riders/drivers and linked to electronic waiver forms and driver's license number and any digital questionnaires that have been presented. As riders/drivers cancel, the ride times and slots open up for other riders/drivers to select. The lead capture, management, and demonstration scheduling system checks if a rider is double booked at the same time.

Figure 2:
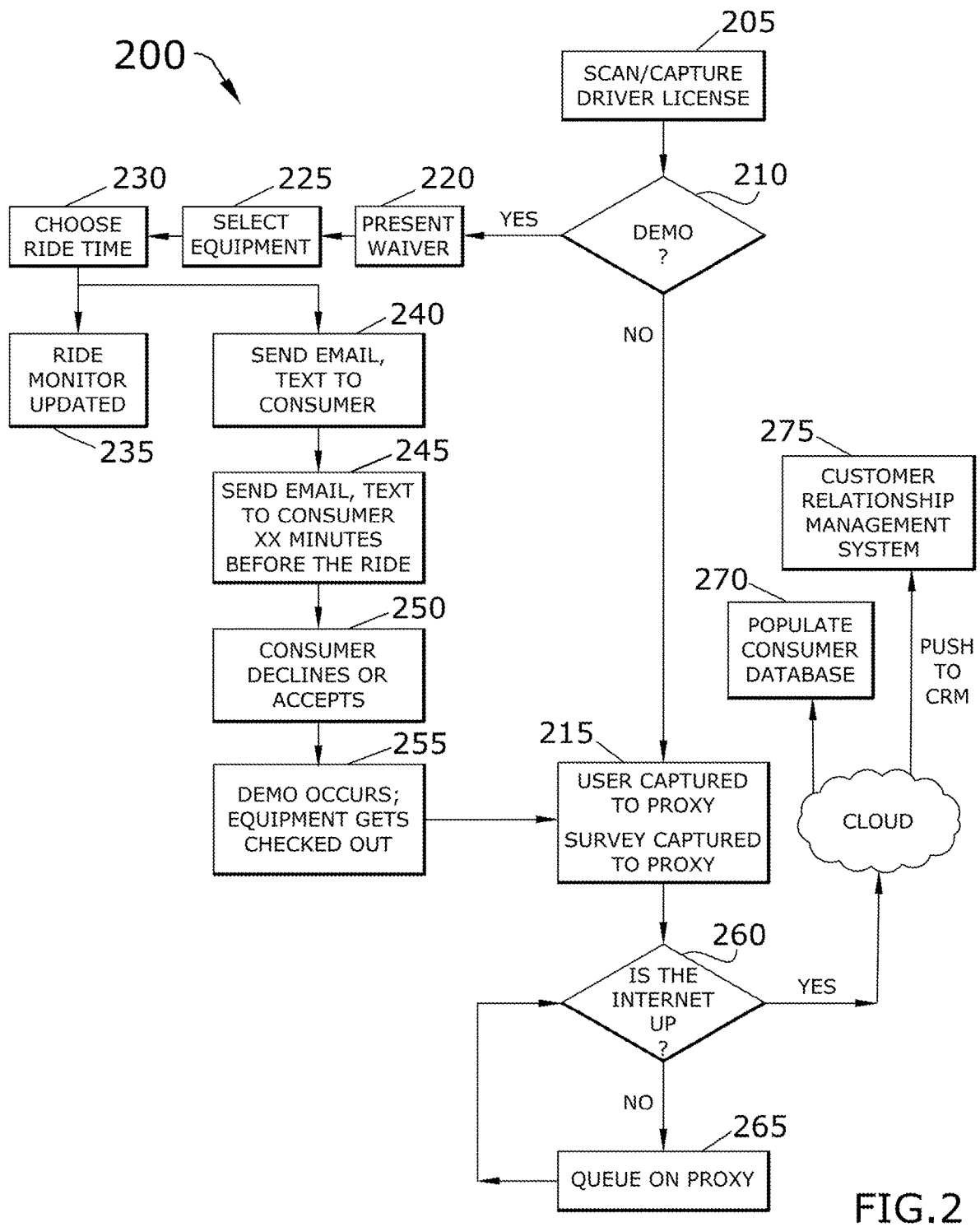
FIG. 2 conceptually illustrates a lead capture, management, and demonstration scheduling process in some embodiments.

By way of example, FIG. 2 conceptually illustrates a lead capture, management, and demonstration scheduling process 200. In some embodiments, the lead capture, management, and demonstration scheduling process 200 is implemented as a software application that runs on a computing device to capture information from a consumer interested in riding or demoing an equipment item. In some embodiments, the tablet computing devices implement the process 200 to capture the consumer information. In some embodiments, one or more cloud servers implements back-end logic based on consumer data received from one or more tablet computing devices. In some embodiments, the software implemented process is performed on another type of computing device, such as a desktop computer, a laptop computer, a mobile computing device, or another computing device used at a live event.

As shown in this figure, the lead capture, management, and demonstration scheduling process 200 starts by scanning or capturing (at 205) driver license information of a consumer. The lead capture, management, and demonstration scheduling process 200 of some embodiments then determines (at 210) whether the consumer wishes to schedule a demonstration of one or more equipment items. When the consumer does not presently wish to book a demonstration, the lead capture, management, and demonstration scheduling process 200 captures the user (i.e., the consumer as a data structure object) to a proxy server. Specifically, the lead capture, management, and demonstration scheduling process 200 adds the driver license information of the consumer to the user data structure object and stores in a database accessible by proxy server. In some embodiments, the lead capture, management, and demonstration scheduling process 200 automatically captures and stores the user data structure object and associated consumer information. In some embodiments, a schedule event listener sub-system captures the user data structure object information when triggered by a particular event, such as adding a new user to the system. An example of such a schedule event listener sub-system is described below by reference to FIG. 6, in which an event-driven real-time schedule change capturing and updating sub-system "listens for" and is triggered by schedule updates or changes.

Figure 6:
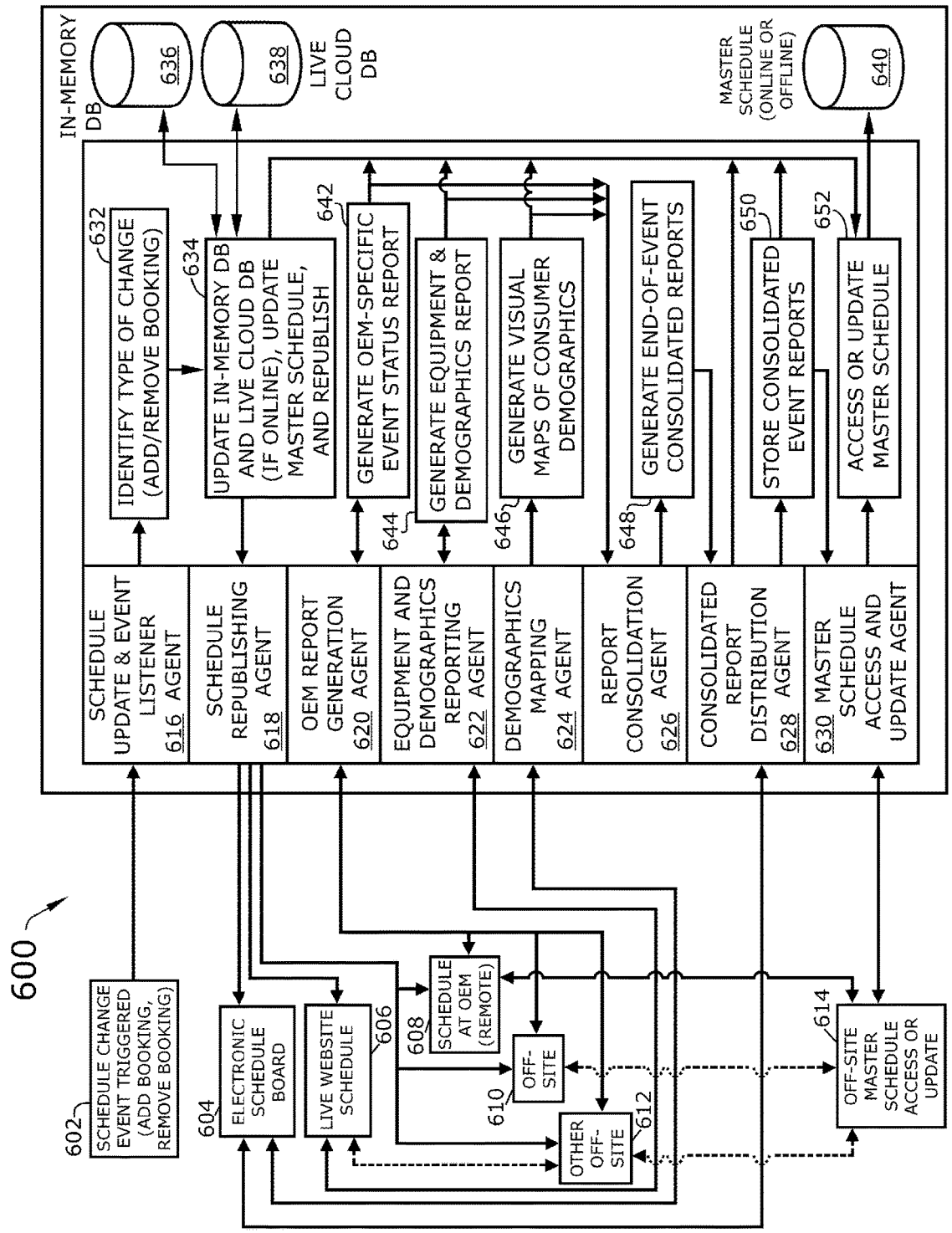
FIG. 6 conceptually illustrates a block diagram of an event-driven real-time schedule change capturing and updating sub-system in some embodiments of a lead capture, management, and demonstration scheduling system.

On the other hand, when a demonstration of equipment is requested by the consumer, then the lead capture, management, and demonstration scheduling process 200 performs several steps toward booking a time for an equipment demonstration. Specifically, the lead capture, management, and demonstration scheduling process 200 presents a waiver (at 220) to the consumer. The waiver is a generally a waiver of liability and includes provisions that depend in large part on the particular equipment item(s) being scheduled for demonstration. The consumer selects an equipment item (at 225) during the next step in the lead capture, management, and demonstration scheduling process 200. In some cases, the consumer can select multiple equipment items for demonstration, and each equipment item may have its own waiver for the consumer to review and approve. During the next step in the lead capture, management, and demonstration scheduling process 200, the consumer choosing a time (i.e., a ride time) in which to book the equipment demonstration (at 230). After an open time is selected by the user for a demonstration (i.e., ride) of the selected equipment, the lead capture, management, and demonstration scheduling process 200 of some embodiments automatically updates (at 235) the ride monitor and schedule. For example, the ride monitor at the booking booth is updated to reflect the consumer's selection of the time for the selected equipment, while contemporaneously, the event schedule is automatically updated and propagated to the electronic schedule board, the website version of the live event schedule, and individual booth monitors and offsite monitors that display the schedule (e.g., different building of the same live event, OEM locations that are are off-site or remote from the live event location, etc.). The event-driven real-time schedule change capturing and updating sub-system described below by reference to FIG. 6, provides more details about the automatic updating of the schedule when a change is detected.

In some embodiments, the lead capture, management, and demonstration scheduling process 200 contemporaneously sends (at 240) email, text message, or other notification to the consumer confirming the equipment demonstration booking time. In some embodiments, the lead capture, management, and demonstration scheduling process 200 waits for a time-based trigger to send a notification to the consumer (at 245), such as by email, text message, etc. Specifically, the lead capture, management, and demonstration scheduling process 200 may send the notification to the consumer when there is a certain number of minutes before the consumer's scheduled demonstration/ride. For example, a text message may be sent automatically to the consumer's smartphone ten minutes before the scheduled demonstration. When the consumer receives the notification during the next step of the lead capture, management, and demonstration scheduling process 200, the consumer can decline or accept (at 250). Specifically, if the consumer accepts, then the scheduled demonstration proceeds as planned, but if the consumer declines, then the scheduled demonstration causes the time slot on the schedule to open up for that time in relation to the equipment item previously selected by the consumer.

When the consumer accepts, then the lead capture, management, and demonstration scheduling process 200 checks out (at 255) the particular equipment item selected by the consumer and proceeds ahead for the demonstration to happen. After the demonstration of the equipment item is completed (e.g., the consumer rode a particular vehicle), the lead capture, management, and demonstration scheduling process 200 of some embodiments provides survey information to the consumer which is captured (at 215) and sent to a proxy server for persistent storage and incorporation into reports, consumer details, etc.

In some embodiments, after the survey is captured and/or after the user account details are captured and saved by proxy server (at 215), the lead capture, management, and demonstration scheduling process 200 determines (at 260) whether the information network for the live event is connected to the internet. For example, the internet may be considered "up" when the live event includes a data network that is connected to the internet and there are no connectivity problems blocking access to the internet, while in other cases, the live event may have a data network that is considered "offline" because it does not include connectivity to the internet. Naturally, individual mobile devices of consumers may have access to the internet even if the live event has a data network that does not connect to the internet. In such cases, schedule information, consumer information, demographics information, and all other data points captured during the live event are stored locally in a master schedule database and later synchronized to internet-accessible sources when such internet connectivity becomes available. Online and offline connectivity is described further below, by reference to FIG. 8.

When the lead capture, management, and demonstration scheduling process 200 determines that the internet is "up", then access is made over the "cloud" (or rather, over a public network) to populate the consumer database (at 270) and push data updates to customer relationship management systems of one or more OEMs (at 275). On the other hand, when the lead capture, management, and demonstration scheduling process 200 cannot find internet connectivity, the surveys, updates, and changes are queued (at 265) on a proxy server (connected to the local live event network, presently in "offline" mode), and the lead capture, management, and demonstration scheduling process 200 returns to the step for determining (at 260) whether the internet is "up" or not. The lead capture, management, and demonstration scheduling process 200 continues to cycle for connectivity until the internet is determined to be "online" which then prompts the lead capture, management, and demonstration scheduling process 200 to proceed to the remaining steps of populating the consumer database (at 270) and pushing updates to the customer CRM systems (at 275).

When the consumer accepts, then the lead capture, management, and demonstration scheduling process 200 is implemented as software, it is noted that such software can also work as a web service that is compatible with browser software running on a computing device being used to capture consumer information at the live event. In some embodiments, the cloud service is implemented as a set of processes that may run on a single web server computer or on multiple computing devices accessible to other "client" computing devices over the Internet (e.g., public network) or an event-based closed (e.g., not public) wide area or local area network. In some embodiments, the cloud service provides linking with one or more social/informational content networks, to which event and equipment schedules may be synchronized for other parties (e.g., distributor, manufacturer, etc.) to view.

While different modes are touched on in this example, a more detailed description of "nearline", "offline", and "online" devices, items, and networks is provided below by reference to FIG. 7.

III. Exemplary Usage of Lead Capture, Management, and Demo Scheduling System and Processes The lead capture, management, and demonstration scheduling system and process begins by capturing consumer information from consumers interested in riding, demoing, or otherwise trying an equipment item. Thus, the initial operations are related to the data or lead capture of information. This is typically face-to-face, from a consumer to a computing device (either monitored or assisted by a representative or not) as implemented by the software. As such, the software of the computing device may determine (i) whether the riders/drivers want to use equipment or (ii) whether the riders/drivers want information about equipment. In some embodiments, the software will determine both, while in other embodiments, the software will determine whether the riders/drivers want information about equipment only if the software has already determined that the riders/drivers do not want to use the equipment. In this case, the software may receive user input in response to presenting a questionnaire. The data from the user input may be captured. If the riders/drivers wish to receive information about equipment, then in some embodiments, the scheduling system will send the information electronically via email or text message. On the other hand, if the riders/drivers want to test equipment, a waiver form is presented for each rider or driver. The waiver form is digitally signed and saved to the server. Equipment is presented with open times and selected by rider/driver or OEM personnel. When an open time gets "booked", a display monitor or screen shows the particular item of OEM equipment as being checked-out or in use.

Figure 3:
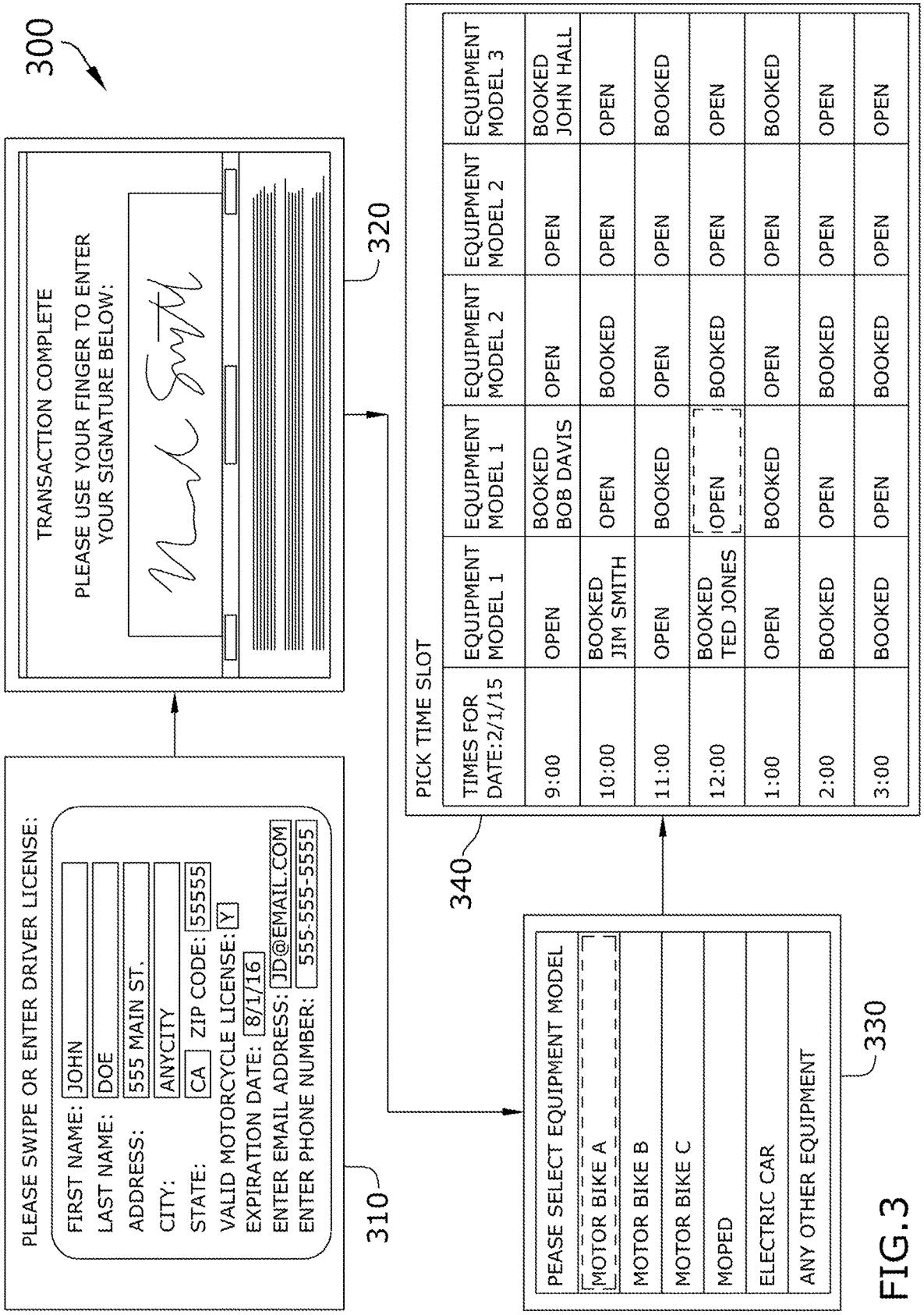
FIG. 3 conceptually illustrates a phase diagram of capturing information of a consumer interested in trying an equipment item and scheduling a time for the consumer to try the equipment item in some embodiments.

By way of example, FIG. 3 conceptually illustrates a phase diagram 300 of capturing information of a consumer interested in trying an equipment item and scheduling a time for the consumer to try the equipment item. As shown in this figure, the phase diagram includes four phases comprising a first phase 310 ("phase one"), a second phase 320 ("phase two"), a third phase 330 ("phase three"), and a fourth phase 340 ("phase four"). Specifically, the information from the consumer is captured starting at phase one 310 with the consumer's driver's license details. In some embodiments, the computing device used to capture the consumer's information includes a scanning device that allows the consumer to swipe their driver's license (if included with a compatible mag stripe). However, if there is no mag stripe on the consumer's license, or if the mag stripe is unreadable (e.g., heavily worn), then the consumer or an event representative may manually enter the consumer's license information. In this example, the consumer information obtained at phase one 310 includes the consumer's first name, last name, address, city, state, zip code, and driver's license expiration date. The other information obtained includes an indication as to whether or not the driver's license of the consumer is valid. In some embodiments, the lead capture, management, and demonstration scheduling system performs an authentication check as to the validity of the consumer's driver's license. For example, the lead capture, management, and demonstration scheduling system may perform an inquiry with the Department of Motor Vehicles from the State that issued the consumer's driver's license. Additional information obtained from the consumer at phase one 310 includes an email address (which may be manually input, even when the consumer swipes his or her driver's license) and a phone number (also may be manually entered after swiping the driver's license of the consumer).

In some embodiments, data capture (e.g., driver's license, motorcycle operators permit, etc.) can operate standalone (e.g., as a separate device, such as a scanner, or as a separate software application, such as an image capture software application that receives an image captured by an on-board camera of a computing device on which the scheduling software runs) or via the lead capture, management, and demonstration scheduling system. In some embodiments, consumer data/information is transmitted to a data server and stored (persisted). Servers of the lead capture, management, and demonstration scheduling system may be located in the cloud or on the premises of an event in which OEM equipment is being checked-out by riders/drivers using the lead capture, management, and demonstration scheduling system.

In some embodiments, the lead capture, management, and demonstration scheduling system captures the consumer information at phase one 310 but only moves to the second phase 320 of FIG. 3 if the driver's permit of the consumer is valid (from phase one 310). In some embodiments, the consumer's driver's permit needs to be valid and a specific age requirement may need to be satisfied. For example, if the lead capture, management, and demonstration scheduling system determines that a consumer would like to use a piece of equipment from an OEM, the logic of the software may then determine whether the consumer has a valid driver's license, operator's license, and/or other certifications that lawfully entitles operation of the OEM equipment item. If the software determines that the drivers/operator's license is valid, the software may then move to an age verification process. In some embodiments, each OEM sets a minimum age requirement for use of a particular item of the OEM. For example, a motorcycle OEM may impose a minimum age of 21 to use a motorcycle at a motorcycle show, thus denying drivers aged 16-20 the ability to try out the motorcycle at the motorcycle show.

In this example, the consumer has a valid driver's permit, but the age verification process is not included. A person skilled in the art would understand that such an age verification process can include a field that indicates the consumer's age, as noted from the information obtained from the consumer's driver's permit.

Nevertheless, even though the consumer's driver's permit has be authenticated as valid (in this example), the consumer is not yet scheduled to ride any equipment. In some embodiments, if the driver's permit is valid (and when needed, if the age is valid), the software may thereafter present a waiver form for the riders/drivers to review and/or sign. In some embodiments, the lead capture, management, and demonstration scheduling system obtains a signature from the consumer. As shown in phase two 320 of FIG. 3, the consumer uses a finger to "sign" on a touch-sensitive screen. In some embodiments, the consumer may use a stylus or another type of signature may be obtained (e.g., capturing an image of a hand-written signature). If the waiver form is signed, equipment options/selections and ride times are presented and selected. However, if the license is invalid or an age issue is present, or if the consumer refuses to sign a waiver, then the software captures all data information and saves to the data storage server. The rider/driver may thereafter be denied use of the OEM equipment.

During the third phase 330 of FIG. 3, the lead capture, management, and demonstration scheduling system presents a set of equipment options/selections for the consumer to choose from. For instance, the consumer may wish to ride a motorcycle being exhibited by a particular OEM or distributor. In this example, the consumer selects "MOTOR BIKE A". Then in the fourth phase 340, the lead capture, management, and demonstration scheduling system identifies times available for the consumer to ride "MOTOR BIKE A" in the scheduling calendar. In this example, the lead capture, management, and demonstration scheduling system identifies an "OPEN" time at 12:00 for the consumer to try the equipment (as denoted by the dashed line).

While the phase diagram 300 shown in FIG. 3 demonstrates how the lead capture, management, and demonstration scheduling system is able to capture consumer information and schedule a time for the consumer to ride a particular equipment item, a person skilled in the art would appreciate that a single event may include several consumer information capture and scheduling computing devices placed at multiple locations of the event venue. This allows the lead capture, management, and demonstration scheduling system to obtain consumer information from multiple consumers at any given time, and schedule equipment demos/rides in relation to each consumer, without conflict or scheduling error. In addition, all data may include ad hoc reporting for OEM event management and the schedule may be published locally or globally (cloud) for all interested parties to see. In this way, all OEMs and distributors have full knowledge of the whereabouts of all their equipment at an event. Furthermore, in some embodiments, multiple events can be run and may include scheduling concurrently with each other using the lead capture, management, and demonstration scheduling system.

While the above examples pertain to aspects of scheduling motorized vehicular equipment at a live event, some embodiments of the lead capture, management, and demonstration scheduling system can be adapted for use in any gathering or get together in which people wish to capture individuals data by using driver's license scanning or manual typing for purposes of allocating equipment or other resources for purposes of scheduling, tracking the use of that equipment by an individual or group and communicating to them in real time or at a later time. Also, the lead capture, management, and demonstration scheduling system could be embedded into any system that has a need to capture, mange or track personnel data, forms and schedule any type of equipment or other resource.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
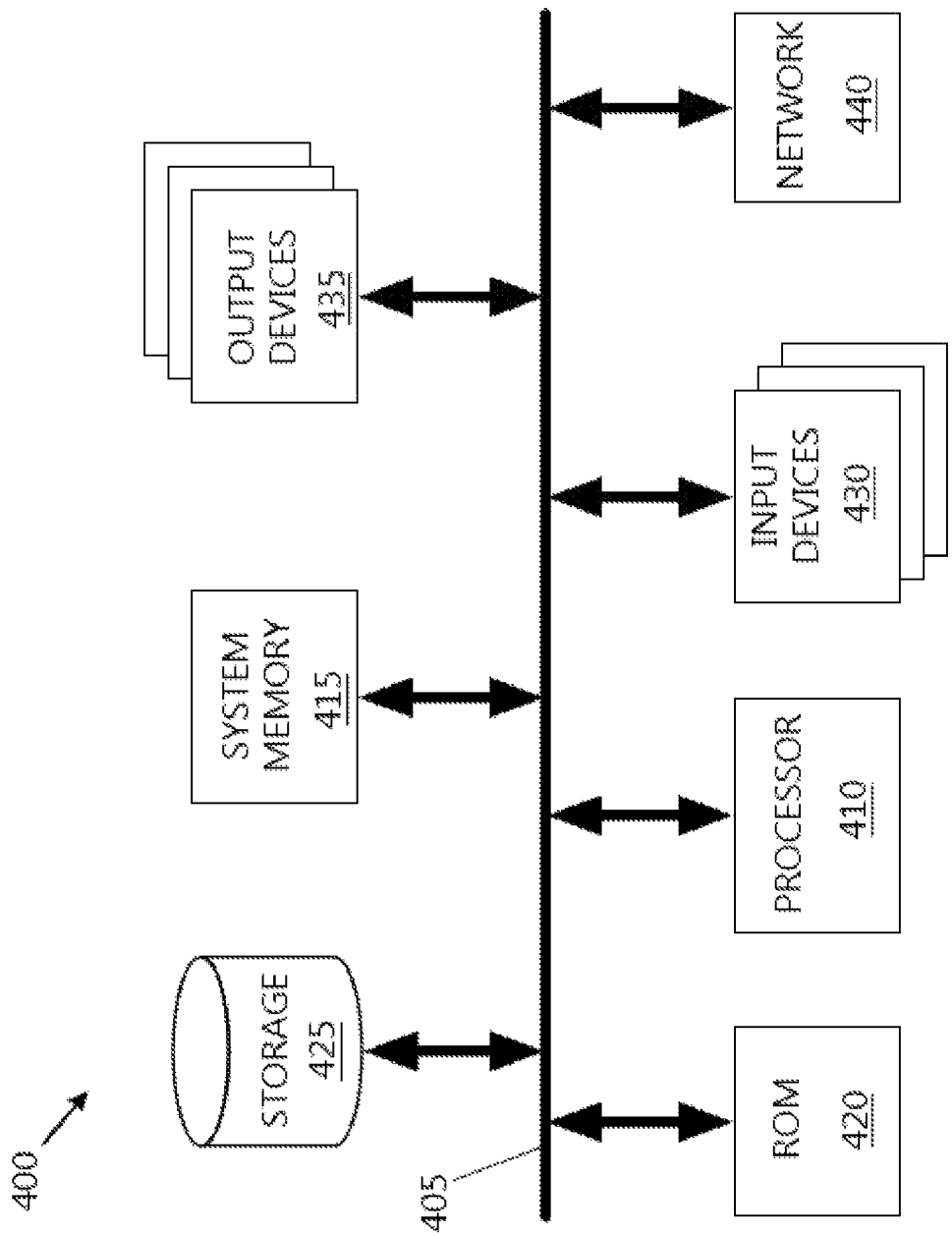
FIG. 4 conceptually illustrates an electronic system with which some embodiments of the invention are implemented.

FIG. 4 conceptually illustrates an electronic system 400 with which some embodiments of the invention are implemented. The electronic system 400 may be a computer, phone, tablet computing device, PDA, or any other sort of electronic device. Such an electronic system includes various types of computer readable media and interfaces for various other types of computer readable media. Electronic system 400 includes a bus 405, processing unit(s) 410, a system memory 415, a read-only 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only 420, the system memory 415, and the permanent storage device 425.

From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards and pointing devices (also called "cursor control devices"). The output devices 435 display images generated by the electronic system 400. The output devices 435 include printers and display devices, such as cathode ray tubes (CRT) or liquid crystal displays (LCD). Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Figure 5:
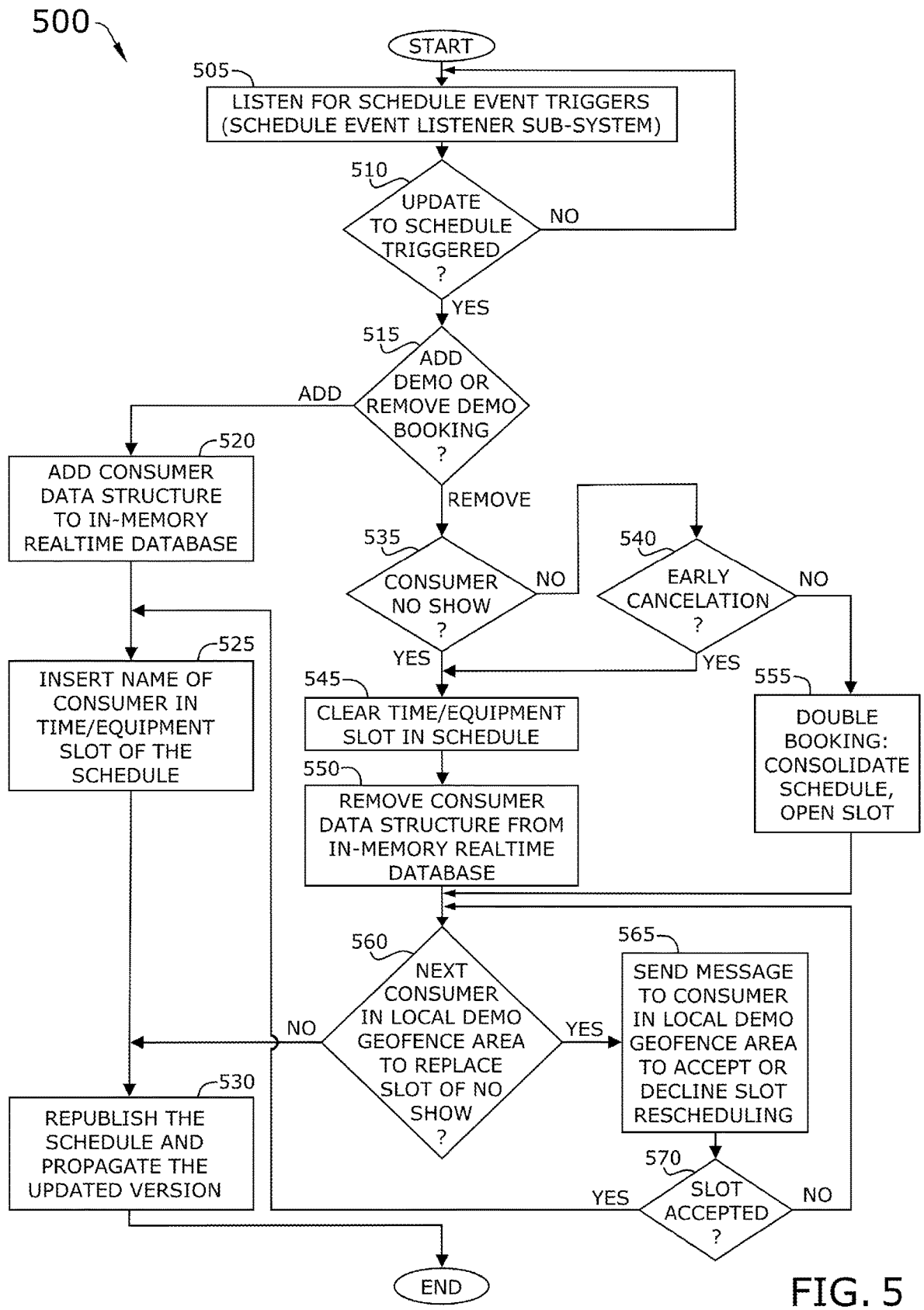
FIG. 5 conceptually illustrates a real-time schedule change process for capturing equipment demonstration booking updates and changing a daily schedule in real-time during a live event in some embodiments.

V. Real-Time Schedule Change Process for Capturing Equipment Demonstration Booking Updates and Changing a Daily Schedule in Real-Time During a Live Event While the lead capture, management, and demonstration scheduling process 200 described above by reference to FIG. 2 provides a high level description of the steps in capturing consumer information and processing consumer requests for equipment demos, some of the steps include several operations in their own right. For instance, the step for automatically updating (at 235) the ride monitor and schedule, after the consumer selects equipment and time, includes several operations which invoke an event-driven real-time schedule change capturing and updating sub-system of a lead capture, management, and demonstration scheduling system. The several operations involved in carrying out the step (at 235) for automatically updating the ride monitor and schedule is, therefore, described next by reference to FIG. 5, which conceptually illustrates a real-time schedule change process 500 for capturing equipment demonstration booking updates and changing a daily schedule in real-time during a live event.

In some embodiments, the real-time schedule change process 500 is performed by an event-driven real-time schedule change capturing and updating sub-system of a lead capture, management, and demonstration scheduling system. An example of an event-driven real-time schedule change capturing and updating sub-system is described further below, by reference to FIG. 6. As shown in this figure, the real-time schedule change process 500 starts by listening (at 505) for schedule event triggers. In some embodiments, a schedule event listener sub-system is an event-driven real-time schedule change capturing and updating sub-system that monitors a lead capture, management, and demonstration scheduling system for schedule events, such as a schedule updates or changes, or new user accounts being created, etc. Thus, while listening for schedule event triggers, the real-time schedule change process 500 determines (at 510) whether an update to the schedule was triggered. For example, a user (i.e., a consumer) may have booked a time slot for a demonstration of a particular equipment item being shown by an OEM, and the "booking" action of the user triggers an automatic "schedule change event" notification that is captured by the event-driven real-time schedule change capturing and updating sub-system of the lead capture, management, and demonstration scheduling system.

When no schedule update or change is determined (at 510) to be triggered, the real-time schedule change process 500 returns to listening (at 505) for schedule event triggers. On the other hand, when an update to the schedule has been triggered, then the real-time schedule change process 500 determines (at 515) whether the update to the schedule has been triggered by an action to add a demonstration booking to the master schedule or to remove a previously scheduled demonstration booking from the master schedule.

When the update to the schedule was triggered by adding a demonstration booking, the real-time schedule change process 500 of some embodiments adds (at 520) a consumer data structure object to an in-memory real-time database. In some embodiments, the consumer data structure object includes a data structure and object container for all of the consumer data thus far captured and tracked, including license information, surveys completed, equipment tried, etc. In some embodiments, the in-memory real-time database is loaded in memory of at least one proxy server that is deployed on the live event network. The consumer data structure object and the in-memory real-time database are described further below, by reference to FIGS. 7 and 8.

After adding (at 520) the consumer data structure object to the in-memory real-time database, the real-time schedule change process 500 inserts (at 525) the name of the consumer in the time/equipment slot of the schedule. Specifically, the name of the consumer is inserted into the time/equipment slot of the schedule that is accessible from the in-memory database loaded in the memory of the proxy server on the live event network. In some embodiments, a physical memory address of the consumer data structure object loaded in the in-memory real-time database is linked to the schedule time/equipment slot by inclusion of a metadata reference to the noted memory address. In this way, the live event schedule object and any consumer data structure object loaded into the in-memory real-time database can be accessed immediately without typical database access mechanisms, such as querying a persistent database that is stored on a hard disk drive (whether spin drive or solid state drive) for a particular record or filtering a set of records to identify a specific data record. In other words, the design and structure of the lead capture, management, and demonstration scheduling system is configured to provide optimal real-time processing of live event scheduling, along with all related consumer data, demographics data, OEM and equipment information, and other such data and information related in one way or another with the live event. Specifically, the lead capture, management, and demonstration scheduling system employs optimal hardware devices, such as random access memory (RAM) by the in-memory real-time database, and employs optimal software systems (i.e., the event-driven real-time schedule change capturing and updating sub-system) and data structures (i.e., schedule data structure object, consumer data structure object, OEM data structure object, equipment data structure object, each with corresponding metadata links to in-memory real-time database addresses in the physical RAM memory) to leverage the processing speed of the optimal hardware devices.

In some embodiments, the real-time schedule change process 500 republishes the schedule (at 530) and propagates the updated version to one or more wider distribution end-points, such as the electronic schedule board at the live event venue, the cloud-based schedule accessible externally to OEMs and other interested parties, other physical location sites used for the live event, etc. The processing performed by the real-time schedule change process 500 for the captured schedule change then ends (however, the real-time schedule change process 500 runs continually because the event-driven real-time schedule change capturing and updating sub-system continuously listens for schedule update event triggers, and whenever any schedule update event is captured, proceeds through the steps of the real-time schedule change process 500).

Now, turning back to the determination (at 515) of whether the update to the schedule has been triggered by an action to add a demonstration booking to the master schedule or to remove a previously scheduled demonstration booking from the master schedule, when the update to the schedule was triggered by removing a previously scheduled demonstration booking, the real-time schedule change process 500 proceeds through several other steps. Specifically, the real-time schedule change process 500 determines how the cause of the removal of the previously scheduled demo booking. Thus, the real-time schedule change process 500 determines (at 535) whether the consumer associated with the previously scheduled demo booking did not show up in time for the equipment demo. For example, some equipment demos require a check-in upon arriving at the location for the equipment demo, and any consumer who fails to check in before the time for their particular equipment demo is removed from the schedule by an authority, such as an OEM representative who accesses a booth monitor to remove the scheduled consumer from the present time slot on the schedule. As a result, an opening on the schedule presents a chance for others to fill the time slot, as will be discussed further below.

When the removal of the previously scheduled demo booking is not the result of a demo-time no show by the consumer, the real-time schedule change process 500 determines (at 540) whether the removal of the demo booking is due to an earlier cancellation of the equipment demo. An early cancellation of the equipment demo can be made explicitly by the consumer or as a result of some other interfering action that causes the lead capture, management, and demonstration scheduling system to automatically cancel the equipment demo on behalf of the consumer. For example, the consumer may independently cancel the demo in order to schedule a different equipment demo at the same time, or the consumer may respond to a demo booking reminder (e.g., text message, email, etc.) by rejecting the equipment demo booking via mobile device. Alternatively, the consumer may schedule a different demo for a different equipment item (perhaps even a different OEM who manufacturers the different equipment item), and upon receiving the schedule change (i.e., the new time slot booking), the event-driven real-time schedule change capturing and updating sub-system of the lead capture, management, and demonstration scheduling system automatically checks the consumer data structure object loaded in the in-memory real-time database and analyzes all links to the master schedule to determine if a conflict with the new time slot booking exists for this consumer; and when such conflict exists, the lead capture, management, and demonstration scheduling system automatically cancels the previously scheduled equipment demo at the old time slot. Regardless of whether the cancellation is a consumer-initiated cancellation or an automatic cancellation by the lead capture, management, and demonstration scheduling system, the point is that this is an early cancellation, which occurs prior to a window of time just before the schedule equipment demo. For example, the window of time just before the demo may be five minutes, two minutes, or some other short time duration prior to the scheduled time. In other words, if and when a previously scheduled demo is canceled prior to the window of time (e.g., 5 minutes, 2 minutes, 1 minute, or whatever window of time is set), then it is characterized as an early cancellation, which provides an opportunity to fill the vacant time slot with another consumer interested in an equipment demo.

When the removal of the demo booking is due to an earlier cancellation of the equipment demo, the real-time schedule change process 500 proceeds to the next step of clearing the time slot (at 545) for the equipment item in the schedule, which is described in further detail below. On the other hand, when the removal of the demo booking is not the result of an early cancellation, then the real-time schedule change process 500 consolidates a double booking (at 555) into a single booking of the equipment demo, updating the schedule, and opening at least one time slot in the schedule. A double booking occurs when a consumer schedules the same equipment demo more than once (e.g., twice, three times, etc.). Since the scope of scheduling is primarily focused on a single day of the live event, double bookings are easily captured by the lead capture, management, and demonstration scheduling system when the consumer name is listed more than once for the same equipment item. However, double bookings arise in other situations as well. For instance, two consumers who attend the live event together may both book a time slot for a particular equipment demo, but may end up enjoying the equipment demo together during one of the two time slots. In such scenario, one of the time slots may be flagged as a double booking by an OEM representative, a live event coordinator, or by the consumer who booked the time slot, which would result in the flagged time slot being opened up for other another consumer to book their own equipment demo. After processing a double booking (at 555), the real-time schedule change process 500 continues to determine (at 560) whether a consumer booked in the next time slot following the opened up time slot is nearby the demo area to move up in time. This step is described in greater detail below.

Turning back to the determination (at 535) of whether the removal of the previously scheduled demo booking is a consequence of the scheduled consumer not showing up in the demo area on time for the equipment demo (i.e., in the window of time before the demo), when the removal of the previously scheduled demo booking is due to consumer no show, the real-time schedule change process 500 clears (at 545) the time/equipment slot in the schedule. For example, an OEM representative in the demo area may use a tool on a mobile device or demo/booth monitor to update the status of the present time slot equipment booking to a "no show" status. This may trigger the event-driven real-time schedule change capturing and updating sub-system of the lead capture, management, and demonstration scheduling system to automatically process the schedule change. In some embodiments, the real-time schedule change process 500 removes (at 550) the consumer data structure object from the in-memory real-time database. However, when the consumer is scheduled for another equipment demo during the same day of the live event, then the real-time schedule change process 500 only removes (at 550) a link between the consumer data structure object and the live event schedule from the in-memory real-time database. For example, the real-time schedule change process 500 may delete a metadata memory address that points to the memory address of the consumer data structure object in the in-memory real-time database from a time slot field of the live event schedule in the in-memory real-time database, while maintaining other existing metadata addressing between other time slots in the schedule and the consumer data structure object which are associated with other (not canceled) equipment demo bookings for the consumer.

Next, the real-time schedule change process 500 of some embodiments determines (at 560) whether a consumer booked in the next time slot following the cleared time slot in the schedule is near the demo area to move up in time. In some embodiments, a geofence area with defined boundaries is established for a demo area, such that a consumer with a GPS capable mobile device can be located to determine whether the consumer is within the geofence area of the demo area. In some embodiments, each demo area for each item of equipment has a defined geofence bounded area that allows the lead capture, management, and demonstration scheduling system to determine when a consumer is nearby a particular demo area. When the consumer in the next time slot is not in the local geofence area that bounds the demo area, other upcoming scheduled consumers are evaluated for their location to determine whether they are present in the local geofence area. When no upcoming scheduled consumer is in the local geofence area, the real-time schedule change process 500 of some embodiments republishes (at 530) the schedule and propagates the updated version to various end points (as noted above). On the other hand, when the consumer booked in the next time slot following the cleared time slot in the schedule is determined (at 560) to be within the geofence area of the particular demo area associated with the cleared time/equipment slot in the schedule, then the real-time schedule change process 500 sends a message (at 565) to the consumer within the geofence area to accept or decline an option to move up to the present time slot for the same equipment demo. In some embodiments, the real-time schedule change process 500 then determines (at 570) whether the consumer within the geofence area accepts or declines the available time slot. When the consumer within the geofence area declines the option to reschedule in the available time slot, the real-time schedule change process 500 returns to the determination (at 560) of whether the next scheduled consumer is within the geofence area and sends a message (at 565) when such consumer is within the geofence area to accept or decline the rescheduling of time slots to the cleared/available time slot. This cycle continues for all of the scheduled consumers who are listed in the schedule for the particular equipment demo following the no show/canceled consumer time slot. However, when the next consumer accepts (at 570) rescheduling of the equipment demo to the available time slot, then the real-time schedule change process 500 continues to the step of inserting (at 525) the name of the next consumer in the time slot of the schedule for the particular equipment demo. While this leads to a double booking scenario, the real-time schedule change process 500 continues to run throughout the live event and would capture the double booking in a manner noted above for consolidating (at 555) the schedule to open the time slot of the identified double booking. This in turn would also prompt the real-time schedule change process 500, by way of the event-driven real-time schedule change capturing and updating sub-system of the lead capture, management, and demonstration scheduling system, to attempt to reschedule other interested consumers (scheduled later in the day for equipment demos). Eventually, upon evaluating and attempting to reschedule one or more later scheduled consumers to one or more cleared/available time slots for equipment demos, the real-time schedule change process 500 then republishes (at 530) the schedule and propagates the updated schedule to the electronic schedule board at the live venue, the live event schedule website, and other end points, as noted above.

In some embodiments, no geofence area is defined by the lead capture, management, and demonstration scheduling system anywhere for the live event, or only a limited number of demo areas include defined geofence boundaries that utilize GPS or other wireless communication mechanisms (e.g., Bluetooth beacons, RFID tags/emitters, etc.) to determine what is within a defined physical surface area. Thus, when no geofence is defined or available for a particular demo area, then the real-time schedule change process 500 determines (at 560) whether the consumer booked in the next time slot following the cleared time slot in the schedule is interested in and able to move up in time by one of the standard communication mechanisms, including email, text messaging, etc., described above by reference to steps 240, 245, and 250 in the lead capture, management, and demonstration scheduling process 200 of FIG. 2. In some embodiments, when the next consumer responds to an inquiry of interest in rescheduling their equipment demo to the available time slot, the real-time schedule change process 500 sends (at 565) a final accept/decline option in a confirmation message (e.g., email, text, etc.). No response in a threshold time period is considered a "decline", but an affirmative "accept" response causes the available time slot to be accepted and the name of the next consumer inserted (at 525) into the available time slot on the schedule, which is then republished (at 530) as noted above.

This cycle continues throughout the entire day or duration of the live event. In some embodiments, the real-time schedule change process 500 is implemented as multi-threaded software (programs, modules, etc.) that run on one or more proxy servers at the physical live event venue and defined in a local network group of the on-site live event network. For instance, the software may be included as part of the event-driven real-time schedule change capturing and updating sub-system of the lead capture, management, and demonstration scheduling system, and may process multiple schedule change events simultaneously or contemporaneously with each other due to being multi-threaded, when at least one of the proxy servers includes a multi-core processor capable for running multiple threads of a same program.

V. Event-Driven Real-Time Schedule Change Capturing and Updating Sub-System

While the real-time schedule change process 500 for capturing equipment demonstration booking updates and changing a daily schedule in real-time during a live event described above by reference to FIG. 5 provides a detailed description of the steps in handling schedule change events that occur through the duration of a live event, several of the steps make reference to an event-driven real-time schedule change capturing and updating sub-system of the lead capture, management, and demonstration scheduling system, which is described in detail next.

By way of example, FIG. 6 conceptually illustrates a block diagram of an event-driven real-time schedule change capturing and updating sub-system 600 of a lead capture, management, and demonstration scheduling system. As shown in this figure, the event-driven real-time schedule change capturing and updating sub-system 600 includes a plurality of agent modules that perform operations in real-time based on actions and events detected or captured by the lead capture, management, and demonstration scheduling system. The plurality of agent modules include a schedule update and event listener agent 616, a schedule republishing agent 618, an OEM report generation agent 620, an equipment and demographics reporting agent 622, a demographics mapping agent 624, a report consolidation agent 626, a consolidated report distribution agent 628, and a master schedule access and update agent 630. The event-driven real-time schedule change capturing and updating sub-system 600 also includes a plurality of databases comprising an in-memory real-time database 636, a live event cloud database 638, and a master schedule database 640. The event-driven real-time schedule change capturing and updating sub-system 600 interacts with or acts in response to a plurality of external items comprising a schedule change event 602, a live event electronic schedule board 604, a live event website schedule 606, a live event schedule at a remote OEM site 608, a live event schedule at an off-site location 610, a live event schedule at some other off-site location 612, and an off-site master schedule access or update module 614.

In some embodiments, the schedule change event 602 is triggered by an action on the schedule. Examples of actions on the schedule include, without limitation, adding an equipment demo booking for a consumer, removing an equipment demo booking of a consumer, adding a new consumer account, updating a consumer account with consumer information (e.g., driver's license information, etc.), blocking a slate of time slots for a particular equipment item (e.g., such as an equipment item taken out of the live event for maintenance or another reason), checking in/out a particular equipment item, etc.

In some embodiments, the live event electronic schedule board 604 visually outputs the live event master schedule on a main display device at the physical live event venue.

In some embodiments, the live event website schedule 606 is accessible to consumers, OEMs, and other interested parties via the internet. In some cases, user credentials are input by consumers, OEMs, or other parties and checked for authentication purposes. For instance, some live events are not intended for the general public to view the schedule, and therefore, all users who access the live event website schedule 606 are required to log in with appropriate user credentials. Such user credentials may limit a view of the schedule depending on a level of user permissions granted to the user. For instance, a particular OEM may have permission to view all information about consumers who have scheduled a demo for an equipment item of the OEM, but may not be allowed to view all the information about other consumers who book equipment demos offered by other OEMs.

In some embodiments, the live event schedule at the remote OEM site 608 represents live event schedules at several remote OEM sites. The live event schedule at the remote OEM site 608 provides a view of the live event schedule that is appropriate for the particular OEM. Specifically, the information propagated to the live event schedule at the remote OEM site 608 for the particular OEM may include vast and detailed consumer, reporting, demographics, etc., information in relation to the demo bookings for equipment offered only by the particular OEM.

In some embodiments, the live event schedule at the off-site location 610 represents a different facility that is either physically disconnected from a central facility of the live event venue or is logically disconnected from a central facility area of the live event venue. For example, a main hall of the live event venue and different wings of the same live event venue that are logically connected to the main hall of the live event, but considered to be off-site locations 610.

In some embodiments, the live event schedule at the other off-site location 612 represents a different facility with a different purpose connected to the live event. For example, a different building that houses a main administrative and coordination operation of the live event, but which does not include any equipment demo areas, OEM-accessible areas, or consumer-accessible areas.

In some embodiments, the off-site master schedule access or update module 614 is a system that is accessed by OEM users, administrative users, live event coordinator users, and other off-site personnel and users to actuate changes to the master schedule. In some embodiments, the off-site master schedule access or update module 614 is accessible via private cloud connection that is password protected and which supports end-to-end data encryption.

When the event-driven real-time schedule change capturing and updating sub-system 600 interacts with or acts in response to any of the external items 602-614, one or more of the agent modules in the plurality of agent modules 616-630 triggers a corresponding internal operation within the event-driven real-time schedule change capturing and updating sub-system 600 or provides information back to the corresponding external item(s).

Specifically, when a schedule change event 602 is triggered by a change to the schedule, the schedule update and event listener agent 616 captures the schedule change event 602 and the event-driven real-time schedule change capturing and updating sub-system 600 proceeds to identify (at 632) a type of change that occurred. Two examples of changes include adding an equipment demo booking to the schedule and removing a previously scheduled equipment demo booking from the schedule. After identifying the type of change, the event-driven real-time schedule change capturing and updating sub-system 600 updates (at 634) the in-memory real-time database 636, updates the master schedule database 640, and republishes the master schedule for distribution and propagation to several schedule viewing end-points. If the live event network is online, and the internet is available, then the event-driven real-time schedule change capturing and updating sub-system 600 also updates (at 634) the live event cloud database with the schedule change. To distribute and propagate the republication of the master schedule, the republished master schedule is transmitted to the live event electronic schedule board 604, the live event website schedule 606, and each remote OEM site 608, off-site location 610, and other off-site location 612 by the schedule republishing agent 618.

In some embodiments, the in-memory real-time database 636 is loaded into a random access memory (RAM) of one or more proxy servers of the live event network and remains loaded in the in-memory real-time database 636 during the entire duration of the live event. Furthermore, the in-memory real-time database 636 is configured store schedule data, OEM data, consumer data, and other data for the live event in an object network that permits optimal retrieval of associated data objects.

An example of an optimized data object is the consumer data structure object. In some embodiments, consumer data structure objects are configured to be stored in the in-memory real-time database 636 to allow optimally fast retrieval of each consumer data structure object, while also designed to be persistently stored in a persistent database storage, such as the master schedule database 640 and (when online) the live event cloud database 638 associated with the particular live event at the present venue. Thus, a demonstration booking of a particular equipment item by a specific OEM and for the benefit of an interested consumer will be captured upon the corresponding triggering event (i.e., the schedule change event 602) and will thereafter be reflected in memory as a micro-network of connected data objects for each of at least the schedule object and linked directly to the booked time/day slot in the schedule, the particular equipment item object, the specific OEM data object, and the interested consumer data structure object. In some embodiments, the data saved in the in-memory real-time database 636 is continuously synchronized to a persistent data storage for the live event with the master schedule database 640, and possibly synchronized (when online) to the live event cloud database 638. In some embodiments, the persistent data storage with the master schedule database 640 for the live event is a local persistent storage that is accessible by way of the live event network, when, for example, the live event network does not have wider internet access. However, when the internet is available to the live event network, then the persistent data storage and master schedule database 640 for the live event is mirrored to the live event cloud database 638 that is continuously accessible to interested parties outside of the live event, such as off-site OEMs, consumers, etc.

In some embodiments, report generation requests are submitted to the event-driven real-time schedule change capturing and updating sub-system 600. In some embodiments, a request is received at the OEM report generation agent 620 from an OEM or other interested party at an off-site or remote location 608-612. In response to the OEM report generation agent 620 receiving such a request, the event-driven real-time schedule change capturing and updating sub-system 600 generates (at 642) an OEM-specific event status report. In some embodiments, the event-driven real-time schedule change capturing and updating sub-system 600 generates (at 642) the report by accessing (at 652) the master schedule database 640 to retrieve all information related to the OEM for the live event. Such information includes, without limitation, scheduled demo bookings, consumer information, demographics information, etc.

In some embodiments, a request is received at the equipment and demographics reporting agent 622 from an OEM or other interested party at an off-site or remote location 608-612 or for publication to the live event website schedule 606. In response to the equipment and demographics reporting agent 622 receiving such a request, the event-driven real-time schedule change capturing and updating sub-system 600 generates (at 644) an equipment and demographics report. In some embodiments, the event-driven real-time schedule change capturing and updating sub-system 600 generates (at 644) the equipment and demographics report by accessing (at 652) the master schedule database 640 to retrieve all equipment and demographics information related to the equipment. In this way, the equipment and demographics report is able to report on what age groups or regions of the country are focused on particular equipment items or types of equipment.

In some embodiments, a request is received at the demographics mapping agent 624 from an OEM or other interested party at an off-site or remote location 608-612, or for publication to the live event website schedule 606 and/or the live event electronic schedule board 604. In response to the demographics mapping agent 624 receiving such a request, the event-driven real-time schedule change capturing and updating sub-system 600 generates (at 646) visual maps of consumer demographics for display on the electronic board 604, on the live event website 606, and/or on digital or print reports (separately or in combination with other information dependent upon type of report requested). In some embodiments, the event-driven real-time schedule change capturing and updating sub-system 600 generates (at 646) the visual maps of consumer demographics for display on the electronic board 604 by accessing (at 652) the master schedule database 640 to retrieve all consumer demographics information related to the equipment in a region associated with the live event.

In some embodiments, the generated reports and visual maps and other information are consolidated for each particular end-user (i.e., OEM, consumer, live event administrator, etc.) when the report consolidation agent 626 receives prompts for consolidated reporting. To consolidate the reports, the report consolidation agent 626 of the event-driven real-time schedule change capturing and updating sub-system 600 generates (at 648) at least one new end-of-event consolidated report. Each consolidated report generated by the report consolidation agent 626 at the end of the live event is a combination of OEM information, consumer information, equipment and demographics information, and demographics maps, such as is generated individually.

After a consolidated end-of-event report is generated (at 648), the consolidated report distribution agent 628 distributes the end-of-event report to the live event electronic schedule board 604, to the live event website board 606, and to the OEMs/other interested parties at off-site or remote locations 608-612. Furthermore, the event-driven real-time schedule change capturing and updating sub-system 600 stores (at 650) any and all consolidated event reports by accessing and updating (at 652) the master schedule database 640.

Finally, the master schedule access and update agent 630 may receive a request (at 614) from off-site location to access or update the master schedule 640, which is appropriately handled by accessing/updating (at 652) the master schedule database 640 upon authentication of user credentials for an OEM user, a consumer user, an administrative user, or other interested user with valid credentials for accessing and updating the master schedule database 640.

VI. Live Event Venue and Live Event Network with Geofenced/Non-Geofenced Equipment Demo Areas In some embodiments, multiple physical site locations for a single live event are connected by way of a single live event network that spans all of the multiple physical site locations. In some embodiments, each physical site location of the single live event deploy a sub-network at the physical site location and all of the sub-networks are logically connected into a single logical live event network, which may include outside accessibility to the internet or not. In such cases of multiple physical site locations, each physical site location with a sub-network also includes its own proxy server and in-memory database that is available for processing needs on the associated physical site location sub-network. Similarly, each physical site location with its own sub-network, proxy server, and in-memory database also includes its own persistent data storage for the live event which is logically associated with the persistent data storages of the other physical site locations among the multiple physical site locations, and which is automatically mirrored locally (for redundancy and fault tolerance) and automatically synchronized into a single physical persistent data storage when a network connection is available from the local sub-network to the logical live event network (whether or not there is wider access to the internet and/or cloud database storage, etc.).

Figure 7:
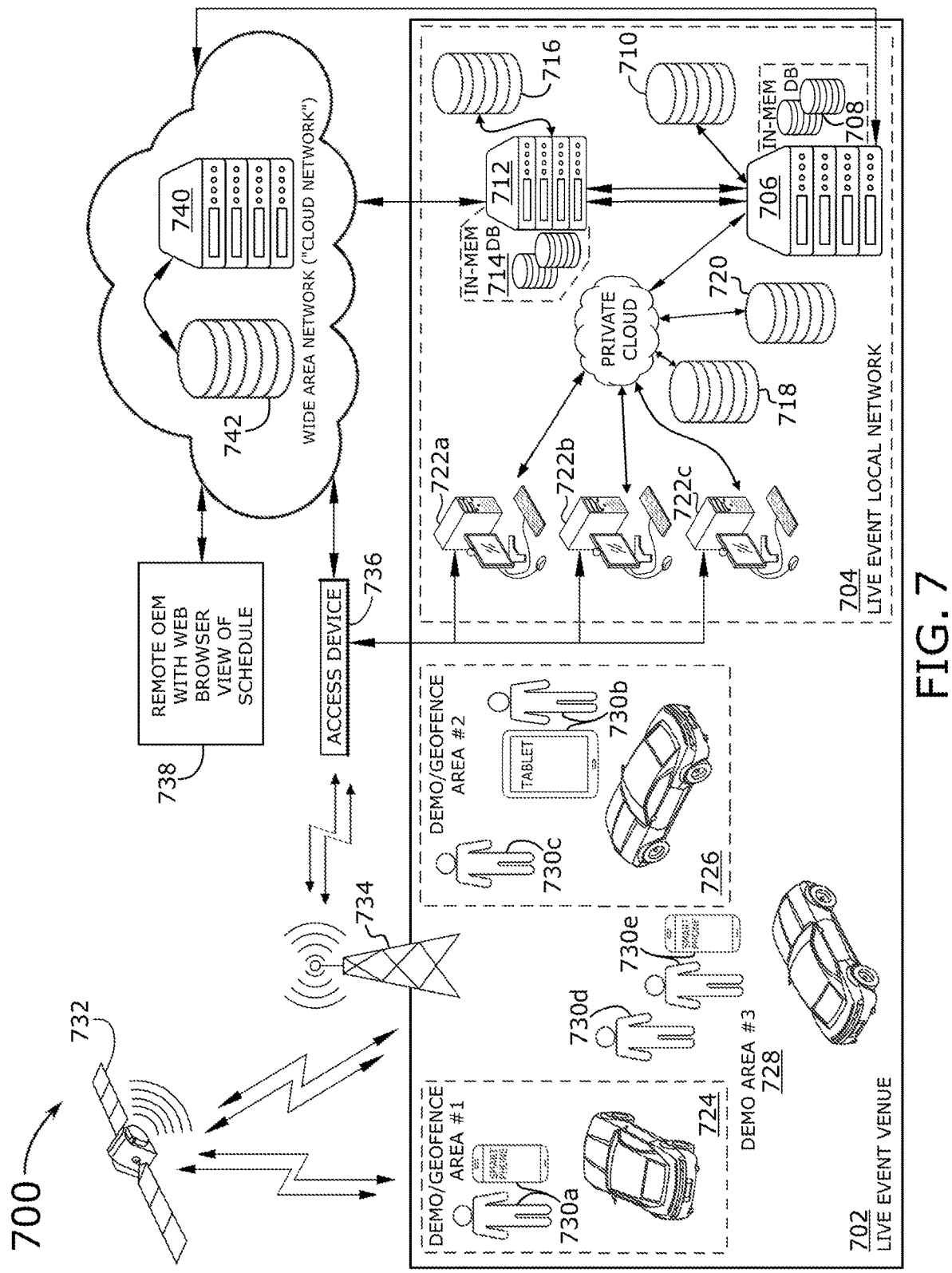
FIG. 7 conceptually illustrates a block diagram of a live event venue that includes a live event local network and geofenced or non-geofenced equipment demo areas in some embodiments.

By way of example, FIG. 7 conceptually illustrates a block diagram of a live event venue that includes a live event local network and geofenced or non-geofenced equipment demo areas 700. Shown in this figure is a live event venue 702, a live event local network 704, first network area proxy servers 706, first network area in-memory databases 708 (a first network area in-memory database 708 for each first network area proxy server 706), a first network area event schedule database 710, second network area proxy servers 712, second network area in-memory databases 714 (a second network area in-memory database 714 for each second network area proxy server 712), a second network area event schedule database 716, a demo area and geofence area coordinates database 718, a master live event schedule database 720 that includes all data stored in the first network area event schedule database 710 and the second network area event schedule database 716, a consumer registration and demo booking computer 722, a first geofenced demo area 724, a second geofenced demo area 726, a third non-geofenced demo area 728, a plurality of consumers 730a-730e, a satellite 732 of a global positioning system (GPS), a wireless communications tower 734, an internet access device 736, a remote OEM site 738 with web browser view of the live event schedule website, a cloud server 740 that hosts the live event schedule website, and a live event cloud database 742 that is updated by synchronization processes on the master live event schedule database 720.

In some embodiments, the live event venue 702 is a venue for a live event and may include indoor and outdoor venue areas. For example, a car show is a live event which allows consumers to see cars (perhaps new model cars) and typically would allow for demos of the cars, such as consumers taking cars out for a drive in a venue test drive strip or some other section of the live event venue 702.

In some embodiments, the live event local network 704 includes a data and communications network that is setup onsite at the live event venue 702 and is accessible by computing and communications devices, such as mobile smartphones, tablet computing devices, computers, scheduling monitors, servers and proxy servers, connected IoT devices, specialty devices (such as Bluetooth beacons, RFID tags or emitters, etc.).

In this figure, the live event venue 702 encapsulates the live event local network 704. However, some of the hardware devices of the live event network 704 may be positioned at locations that are off-limits to consumers attending the live event (i.e., the car show), while other hardware devices of the live event network 704 may be in general purpose areas so that consumers and others can utilize those devices in furtherance of scheduling equipment demos (i.e., scheduling a time to take a particular car out for a ride). Additionally, the live event network 704 may span multiple disparate or distance areas within the live event venue 702. In this figure, there are two such disparate areas and the live event local network 704 handles high volume data processing and throughput by deploying redundant hardware devices in the disparate areas, and then mirroring and synchronizing the data captured in each area into consolidated data resources (such as a single local live event schedule database).

Accordingly, the first network area proxy servers 706 includes at least one first network proxy server 706 and is deployed in a figurative first network area (not demarcated in this figure). The first network area proxy server 706 includes the first network area in-memory database 708 (or when there are multiple first network area proxy servers 706, a first network area in-memory database 708 for each first network area proxy server 706) which is loaded into physical memory (RAM) of the proxy server and remains in memory for the duration of the live event. Equipment bookings and schedule changes/updates are handled at exemplary speeds due to the readily accessible schedule, OEM, equipment, and consumer data structure objects and local in-memory cross referencing (via memory address). Data is contemporaneously mirrored to the first network area event schedule database 710, which is a hard disk-type persistent storage. Data replication/mirroring may involve some lag, but the data mirroring lag is handled by separating execution of data mirroring from the execution of the live event real-time equipment booking and schedule changing/updating. For instance, separate threads of execution on a multi-core processor, or separate processing units for each, etc. Thus, there is no bottle neck or race condition that would otherwise run the system to a halt when the persistent data storage in the first network area event schedule database 710 lags behind the high transaction volume of the first network area in-memory database 708.

Similarly, the second network area proxy servers 712 includes at least one second network proxy server 712 and is deployed in a figurative second network area (not delineated in this figure). The second network area proxy server 712 includes the second network area in-memory database 714 (or when there are multiple second network area proxy servers 712, a second network area in-memory database 714 for each second network area proxy server 712). The second network area in-memory database 714 is loaded into physical memory (RAM) of the second network area proxy server 712 and remains in memory for the duration of the live event, providing enhanced speed and optimal data processing/handling. Additionally, the data is contemporaneously mirrored to the second network area event schedule database 716, which is a hard disk-type persistent storage.

The live event local network 704 also includes the demo area and geofence area coordinates database 718 which stores geofence perimeter information and is mapped over stored equipment demo area coordinates and data. Additionally, the live event local network 704 includes the master live event schedule database 720. In particular, the master live event schedule database 720 includes all data stored in the first network area event schedule database 710 and the second network area event schedule database 716. In some embodiments, the data from the second network area event schedule database 716 is transferred by the second network area proxy server 712 to the first network area proxy server 706, which consolidates the data from both the first network area event schedule database 710 and the second network area event schedule database 716, and thereafter sends the consolidated live event data to the master live event schedule database 720 over private cloud connection. The private cloud connection relates to a permissions scheme of the live event local network 704, which would be present to prevent unintended or malicious data downloads or uploads. Thus, the first network area proxy server 706 may need to provide valid user credentials to be authenticated prior to storing any data in the master live event schedule database 720. In some embodiments, a third proxy server is deployed for synchronizing (i.e., receiving/retrieving) data from each of the first network area proxy server 706 and the second network area proxy server 712, consolidating the data, and then storing the consolidated data in the master live event schedule database 720.

The live event local network 704 also includes scheduling monitors 722a-722c, which are used by OEM representatives or consumers to capture consumer information for new account creation or updating user information, selecting equipment and times for demos, scheduling equipment demos as selected, and/or changing or updating previously scheduled equipment demos.

Moving away from the live event local network 704, several demo areas and geofence areas are shown in another area of the live event venue 702. Specifically, the first geofenced demo area 724 includes a car and a consumer 730a. The second geofenced demo area 726 includes another car and two consumers, namely, consumer 730b and consumer 730c. The third non-geofenced demo area 728 includes at least a car and possibly two consumers (consumer 730d and consumer 730e), although it is not clear where the third demo area 728 starts and ends, since it is not geofenced.

With the satellite 732 of a global positioning system (GPS) and the wireless communications tower 734, the consumers in and around the first geofenced demo area 724 and the second geofenced demo area 726 can be found and their location determined. However, this is not true of consumer 730d and consumer 730e because the demo area to which they are closest is a non-geofenced demo area. Thus, unlike consumers in and around the first geofenced demo area 724 and the second geofenced demo area 726, the impact on the two consumers—consumer 730d and consumer 730e—is that neither consumer would be known to be nearby the third demo area 728.

Along with the wireless communications tower 734, the internet access device 736 provides wider internet access to the mobile devices of the consumers 730a-e and the scheduling monitors 722a-c. Also accessing the wider internet is the remote OEM site 738 with web browser view of the live event schedule web site. It is noted here that the remote OEM site represents one or several OEMs at their respective remote sites.

In the cloud (or rather, via wider internet access), devices connect to the cloud server 740 that hosts the live event schedule website, which is visually output on screens of devices according to data populated from the live event cloud database 742 that is updated by synchronization processes on the master live event schedule database 720. Another manner is by direct access to the wide area internet (or "cloud") to tap the cloud server 740 and the live event cloud database 742 for display of the live event schedule when online, but perhaps offsite.

VII. Cloud Computing Network Architecture of the Lead Capture, Management, and Demonstration Scheduling System While the previous example of the live event venue described by reference to FIG. 7 focused on a description of the live event local network and geofenced or non-geofenced equipment demo areas 700, the cloud network architecture of the lead capture, management, and demonstration scheduling system was only touched on at a high level. Therefore, in the following example, a more detailed description of a cloud computing software-as-a-service (SaaS) network architecture is provided.

Figure 8:
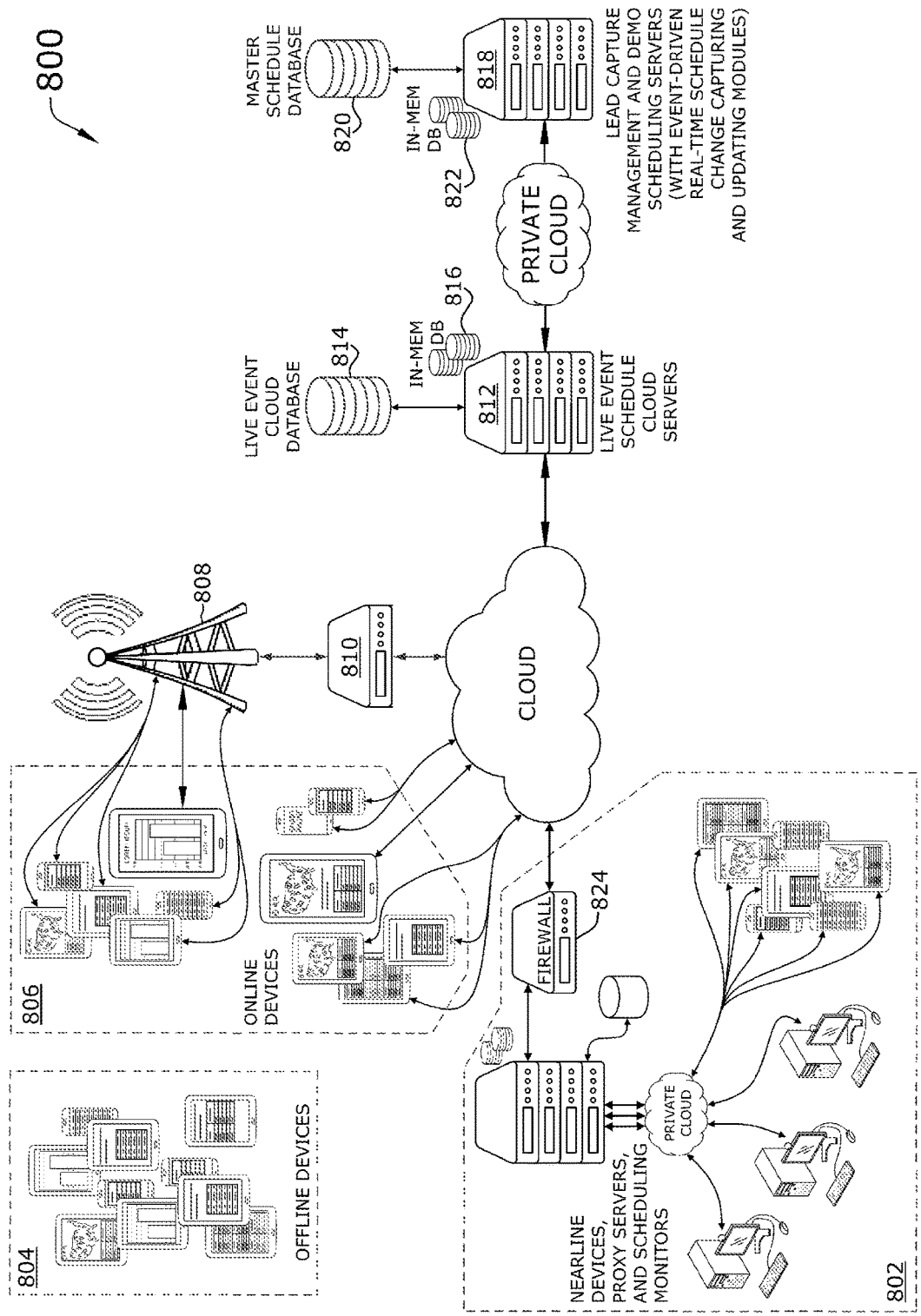
FIG. 8 conceptually illustrates a cloud computing software-as-a-service (SaaS) network architecture over which the lead capture, management, and demonstration scheduling system is deployed in some embodiments.

By way of example, FIG. 8 conceptually illustrates a cloud computing software-as-a-service (SaaS) network architecture of the lead capture, management, and demonstration scheduling system 800. As shown in this figure, the cloud computing SaaS network architecture of the lead capture, management, and demonstration scheduling system 800 includes a nearline group 802 (inclusive of devices and items within dashed line area 802), an offline group 804 (inclusive of devices within dashed line area 804), and an online group 806 (inclusive of devices within dashed line area 806).

The nearline group 802 includes many of the devices and items as demonstrated in the live event local network 704, described above by reference to FIG. 7, including proxy servers, scheduling monitors, the live event schedule database, in-memory real-time databases, and access and capture mobile devices. The nearline group 802 also includes a firewall 824.

Similarly, the offline group 804 includes capture devices. The capture devices in the offline group 804 capture consumer information and transfer the consumer information captured while offline to one or more proxy servers of the nearline group 802 when connected over the private local live event network (shown in the nearline group 802 as "private cloud").

The online group 806 includes online (or connected) devices that access the live event schedule via cloud connection to the schedule website or wireless mobile device connection to a communications tower 808 and a gateway 810 that provide access to the schedule website.

In the cloud service side, several components are shown which flesh out the details of the cloud/wide area public network aspect only touched on in the description of FIG. 7. Thus, live event schedule cloud servers 812 are shown as connection initiating devices for the proxy server and firewall 824 of the nearline group and several of the devices in the online group 806, as well as the gateway 810. The live event schedule cloud servers 812 includes at least a web server that hosts the live event schedule website. A live event cloud database 814 is also shown. The live event cloud database 814 is communicably connected to the live event schedule cloud servers 812. Furthermore, the live event schedule cloud servers 812 run in-memory real-time database(s) 816 from which schedule information is extracted for visual display on the live event schedule website.

Over a private cloud connection, one or more lead capture management and demo scheduling servers 818 is shown. At least one includes the event-driven real-time schedule change capturing and updating server module. In connection with the lead capture management and demo scheduling servers 818 is a master schedule database 820 and an in-memory real-time database 822. Thus, consumers, OEMs, and any other interested and authorized user can access a real-time schedule of the live event while the live event is ongoing. In this way, all parties, whether on-site or remotely located, are able to stay up to date with all the live event actions and interest of consumers.

While the invention has been described with reference to numerous specific details, one of ordinary skill in the art will recognize that the invention can be embodied in other specific forms without departing from the spirit of the invention. For instance, FIGS. 2 and 5 conceptually illustrate processes. The specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a program which, when executed by at least one processing unit of a computing device, captures information of a consumer interested in trying an equipment item being exhibited at a physical venue hosting an event, said program comprising sets of instructions for:

receiving, at a computing device used to capture consumer information and by a scanning device that is communicably connected to the computing device, a set of drivers permit information associated with the consumer as obtained from a drivers permit of the consumer, wherein the set of drivers permit information comprises a state from which the consumer obtained the drivers permit, an age of the consumer, and a name of the consumer;

checking the drivers permit information to identify the state from which the consumer obtained the drivers permit;

inquiring with a department of motor vehicles (DMV) associated with the identified state from which the consumer obtained the drivers permit to determine whether the drivers permit of the consumer is valid;

receiving, at the computing device used to capture consumer information and by way of a touchscreen that is communicably connected to the computing device and with which the consumer inputs a signature at the touchscreen by a touchscreen interaction comprising one of a finger touch gesture and a stylus, an electronic signature of the consumer as a waiver of liability when the DMV inquiry of the drivers permit of the consumer is determined valid;

checking the drivers permit information to identify the age of the consumer;

identifying age restrictions of original equipment manufacturers (OEMs) to apply to consumers for equipment items;

displaying, on the touchscreen, a set of equipment items available for the consumer to select, wherein the age of the consumer is within the permitted age restrictions of the OEMs as applied to the set of equipment items available for the consumer to select;

receiving, by consumer touchscreen interaction with the set of equipment items displayed on the touchscreen, a selection of a particular equipment item from the set of equipment items available for the consumer to select;

scheduling a time in an equipment schedule for the consumer to try the particular equipment item, wherein scheduling the time in the equipment schedule automatically triggers a schedule change event;

capturing, by a schedule event listener sub-system, the schedule change event;

adding, by a schedule update agent, a consumer data structure with consumer data, time data, equipment data, and OEM data to an in-memory realtime database associated with a master equipment schedule, wherein the consumer data structure includes the set of drivers permit information associated with the consumer;

inserting, by the schedule update agent, the name of the consumer in a particular time slot of the master equipment schedule, wherein the particular time slot is associated with the scheduled time in the equipment schedule and the particular equipment item as selected; and publishing, by a schedule republishing agent, an update of the equipment schedule based on the consumer data structure added to the in-memory realtime database associated with the master equipment schedule, wherein the published update of the equipment schedule includes the particular equipment item scheduled at the time for the consumer to try the particular equipment item.

2. The non-transitory computer readable medium of claim 1, wherein the set of drivers permit information associated with the consumer comprises an address of the consumer, a city of the consumer, and a drivers permit class, wherein the name of the consumer in the set of drivers permit information includes a first name of the consumer and a last name of the consumer.

3. The non-transitory computer readable medium of claim 2, wherein the set of drivers permit information associated with the consumer is obtained by the scanning device reading a magnetized stripe along one side of the drivers permit of the consumer, said magnetized stripe comprising the set of drivers permit information associated with the consumer.

4. The non-transitory computer readable medium of claim 1 further comprising a set of instructions for transmitting the set of drivers permit information associated with the consumer and the electronic signature of the consumer to a cloud server for persistent storage and real-time communication.

5. The non-transitory computer readable medium of claim 4 further comprising sets of instructions for:

updating the in-memory realtime database associated with the master equipment schedule when a second schedule change event is captured by the schedule event listener sub-system, wherein the second schedule change event is triggered by one of (i) a second consumer scheduling a second time in the equipment schedule for the second consumer to try a second equipment item and (ii) the consumer rescheduling the time in the equipment schedule for the consumer to try the particular equipment item;

storing the updated master equipment schedule at the cloud server for event retrieval and publication; and republishing the equipment schedule, by the schedule republishing agent, to an electronic schedule board and a live website schedule site, wherein the equipment schedule is republished based on the master equipment schedule as stored and updated, wherein the republished equipment schedule is available through the cloud service associated with the live website schedule site for an interested party to retrieve in real-time using a computing device from a location that is not the physical venue hosting the event.

6. The non-transitory computer readable medium of claim 4, wherein the set of drivers permit information associated with the consumer and the electronic signature of the consumer is available through the cloud server for an interested party to retrieve in real-time using a computing device from a location that is not the physical venue hosting the event.

7. The non-transitory computer readable medium of claim 1 further comprising sets of instructions for:

generating, by an equipment and demographics reporting agent, a report comprising demographic information associated with the consumer and a set of other consumers scheduled to try an equipment item at the physical venue hosting the event; and generating, by a demographics mapping agent, a visual map of consumer demographics at the event based on the state in the drivers permit information associated with the consumer and each of the consumers in the set of other consumers scheduled to try an equipment item at the physical venue hosting the event.

8. A lead capture, management, and demonstrating scheduling system to schedule equipment demonstrations across multiple equipment demo areas at a live event venue, the lead capture, management, and demonstrating scheduling system comprising:
- a cloud server that is remotely deployed away from the live event venue, said cloud server configured to host a live event schedule website that is accessible to remote web browser users over a cloud network;
- a demo area and geofence area coordinates database connected to a live event local network deployed at the live event venue, said demo area and geofence area coordinates database storing geofence perimeter information for each of a first geofenced demo area and a second geofenced demo area at the live event venue;
- a first network area proxy server comprising a first physical random access memory (RAM), said first network area proxy server connected to the live event local network deployed at the live event venue, said first network area proxy server communicably connected to a first monitor that is configured to receive first area user interactions from consumers within the first geofenced demo area, said first area user interactions providing live event consumer and equipment information within the first geofenced demo area;
- a first network area in-memory database that is loaded in the first physical RAM of the first network area proxy server and remains in the first physical RAM during the live event to store live event consumer and equipment information associated with consumers and equipment in the first geofenced demo area as received from the first monitor;
- a first network area event schedule database that is communicably connected to the first network area proxy server in the live event local network deployed at the live event venue, said first network area event schedule database configured to receive and persistently store live event consumer and equipment information mirrored from the first physical RAM and associated with consumers and equipment in the first geofenced demo area as received from the first monitor;
- a second network area proxy server comprising a second physical RAM, said second network area proxy server connected to the first network area proxy server over the live event local network deployed at the live event venue, said second network area proxy server communicably connected to a second monitor that is configured to receive second area user interactions from consumers within the second geofenced demo area, said second area user interactions providing live event consumer and equipment information within the second geofenced demo area;
- a second network area in-memory database that is loaded in the second physical RAM of the second network area proxy server and remains in the second physical RAM during the live event to store live event consumer and equipment information associated with consumers and equipment in the second geofenced demo area as received from the second monitor;
- a second network area event schedule database that is communicably connected to the second network area proxy server and is configured to receive and persistently store live event consumer and equipment information mirrored from the second physical RAM and associated with consumers and equipment in the second geofenced demo area as received from the second monitor;
- a master live event schedule database connected to the live event local network deployed at the live event venue and is configured to consolidate and store all live event consumer and equipment information stored in the first network area event schedule database and the second network area event schedule database;
- a cloud database that is communicably connected to the cloud server and is accessible over the cloud network, said cloud database configured to receive and store all live event consumer and equipment information synchronized in near real-time from the master live event schedule database during the live event in which the equipment is demonstrated at the live event venue; and
- a set of computing devices for capturing consumer information in relation to scheduling equipment at the live event for check-out and use by interested consumers in each of the first geofenced demo area and the second geofenced demo area, each computing device comprising a processor, a memory unit, and a storage device that stores a program which when executed by the processor of the computing device performs a process comprising:
  - capturing a set of information related to a drivers permit of a consumer interested in trying one or more equipment items at the live event;
  - automatically checking whether the drivers permit is valid;
  - identifying a geospatial location of the consumer at the live event venue;
  - identifying a particular geofenced demo area that contains the identified geospatial location based on the geofence perimeter information for each of the first geofenced demo area and the second geofenced demo area at the live event venue;
  - displaying, on a particular monitor that corresponds to one of the first monitor associated with the first geofenced demo area and a second monitor associated with the second geofenced demo area, a set of equipment available in the particular geofenced demo area for the consumer to schedule a demo in a local monitor event equipment schedule;
  - receiving a selection of a particular equipment item;
  - updating the local monitor event equipment schedule based on the received selection of the particular equipment item;
  - transmitting, over the live event local network deployed at the live event venue, the updated local monitor event equipment schedule to a particular network area proxy server that corresponds to the particular geofenced demo area to store data for the update to the local monitor event equipment schedule in the master live event schedule database;
  - transmitting the data for the update to the local monitor event equipment schedule from the master live event schedule database to the cloud database for synchronous persistent storage and for retrieval by a web browser running on a computing device of a user who is not at the live event venue; and
  - generating one or more reports of consumer demographics, equipment types demonstrated, and the live event at which the equipment is demonstrated to the consumers.

9. The lead capture, management, and demonstrating scheduling system of claim 8, wherein the set of information related to the drivers permit of the consumer comprises a first name, a last name, an email address, a telephone number, an address, a city, a state, a zip code, and a drivers permit status.

10. The lead capture, management, and demonstrating scheduling system of claim 9, wherein the cloud server comprises a server processor, a server memory unit, and a server storage device that stores a server program which when executed by the server processor of the cloud server performs a server communication process comprising:
- receiving the set of information related to the drivers permit of the consumer;
- receiving the selection of the particular equipment item;
- generating a confirmation message to transmit to one of the email address and the telephone number, said confirmation message comprising the particular equipment item selection and an event equipment schedule time to schedule the consumer to try the particular equipment item; and
- receiving a confirmation reply message that confirms the event equipment schedule time to schedule the consumer to try the particular equipment item in the particular geofenced demo area at the live event venue.

* * * * *